(12) United States Patent
Young et al.

(10) Patent No.: US 9,802,704 B2
(45) Date of Patent: Oct. 31, 2017

(54) FOLDING GALLEY UNIT

(71) Applicant: THE BOEING COMPANY, Chicago, IL (US)

(72) Inventors: Stephen M. Young, Mill Creek, WA (US); Carl Aaron Davison, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 35 days.

(21) Appl. No.: 14/657,727

(22) Filed: Mar. 13, 2015

(65) Prior Publication Data
US 2016/0264246 A1 Sep. 15, 2016

(51) Int. Cl.
*B64D 11/04* (2006.01)

(52) U.S. Cl.
CPC ................ *B64D 11/04* (2013.01)

(58) Field of Classification Search
CPC . Y10T 16/54; Y10T 16/5401; Y10T 16/5404; Y10T 16/54048; E05D 11/10; E05D 11/1007; E05D 11/1014; E05D 11/1028; E05D 11/105
See application file for complete search history.

(56) References Cited

U.S. PATENT DOCUMENTS

| | | | | |
|---|---|---|---|---|
| 6,257,523 B1* | 7/2001 | Olliges | ................ | B61D 17/048 160/210 |
| 6,318,824 B1* | 11/2001 | LaGrotta | ................ | E05D 3/022 312/322 |
| 6,988,586 B1* | 1/2006 | Perez | ................ | E06C 1/397 182/21 |
| 8,047,467 B2* | 11/2011 | Erickson | ............ | B64D 11/0015 244/118.1 |
| 8,387,213 B2* | 3/2013 | Brunnmayr | ............. | E05F 5/006 16/319 |
| 8,387,916 B2* | 3/2013 | Baatz | ................ | B64D 11/0007 244/118.1 |
| 8,511,509 B2* | 8/2013 | Merritt | ................ | B01L 1/50 16/345 |
| 9,321,533 B2* | 4/2016 | Cuddy | ................. | B64C 1/1407 |
| 9,359,078 B2* | 6/2016 | Burd | ..................... | B64D 11/04 |
| 2001/0050519 A1* | 12/2001 | Kasuya | ................ | B64D 11/04 312/315 |
| 2006/0070814 A1* | 4/2006 | Hu | ........................... | B62B 5/00 186/45 |
| 2006/0108899 A1* | 5/2006 | Jin | ........................ | A47B 43/00 312/257.1 |

(Continued)

*Primary Examiner* — Justin Benedik
(74) *Attorney, Agent, or Firm* — Patterson + Sheridan, LLP

(57) ABSTRACT

Method and apparatus for providing a modular unit through a confined entryway. The modular unit includes portions that are foldable between a transit configuration and a deployed configuration. In the transit configuration, the modular unit can fit through the confined entryway. In the deployed configuration, the modular unit may not fit through the door, but can have larger dimensions. Once past the confined entryway, the foldable portions can be quickly moved to the deployed configuration and fixed in place with a small number of pins or other fasteners. In some instances, multiple modular units may be attached together to form a larger unit. The modular units can include foldable portions, and the modular units can be connected together with a relatively small number of fasteners.

20 Claims, 15 Drawing Sheets

(56) References Cited

U.S. PATENT DOCUMENTS

| | | | | |
|---|---|---|---|---|
| 2008/0047918 A1* | 2/2008 | Kirkwood | ............... | A47B 43/00 |
| | | | | 211/194 |
| 2008/0116773 A1* | 5/2008 | Van Loon | ............... | A47B 31/00 |
| | | | | 312/198 |
| 2008/0150406 A1* | 6/2008 | Arnold | .................... | B64D 11/04 |
| | | | | 312/237 |
| 2008/0265724 A1* | 10/2008 | Robins | .................... | A47B 21/00 |
| | | | | 312/223.3 |
| 2010/0140890 A1* | 6/2010 | Boivin | .................... | B62B 3/004 |
| | | | | 280/47.34 |
| 2013/0063010 A1* | 3/2013 | Liu | ....................... | A47B 81/002 |
| | | | | 312/238 |
| 2014/0054416 A1* | 2/2014 | Lee | ......................... | B64D 47/00 |
| | | | | 244/118.1 |
| 2015/0069179 A1* | 3/2015 | Ehlers | .................... | B64D 11/04 |
| | | | | 244/118.5 |
| 2015/0308172 A1* | 10/2015 | Veino | .................... | E05D 7/1061 |
| | | | | 49/380 |

\* cited by examiner

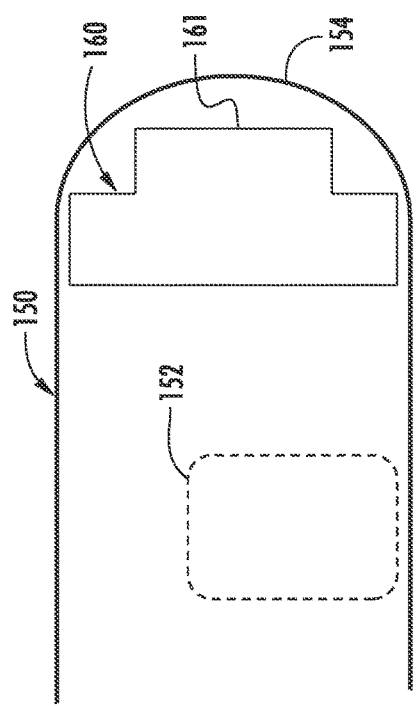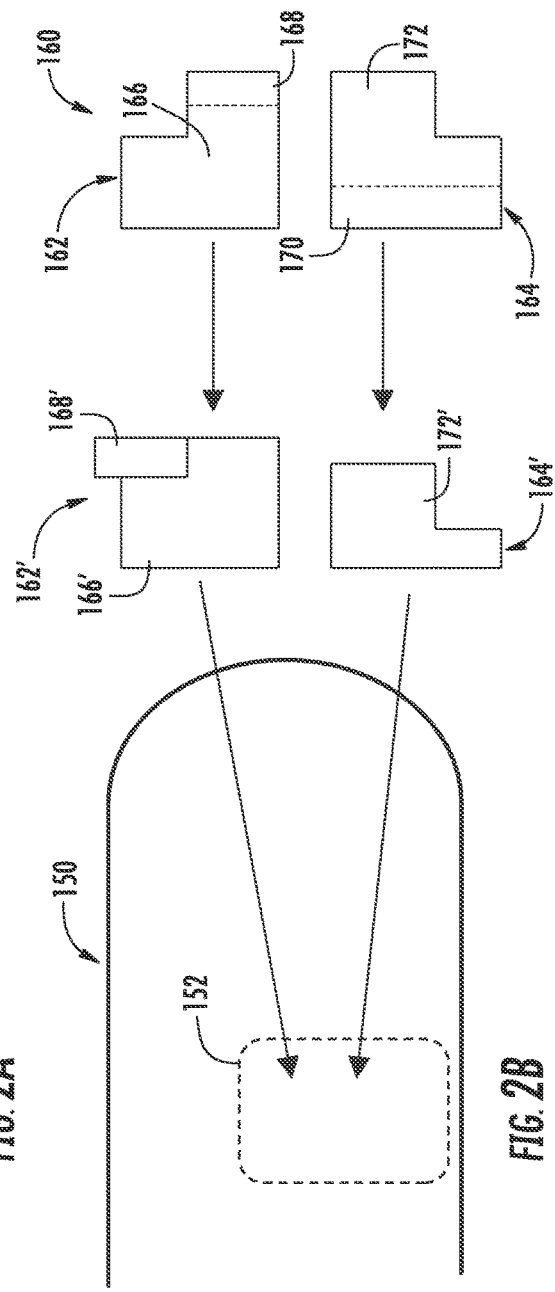
FIG. 2A
FIG. 2B

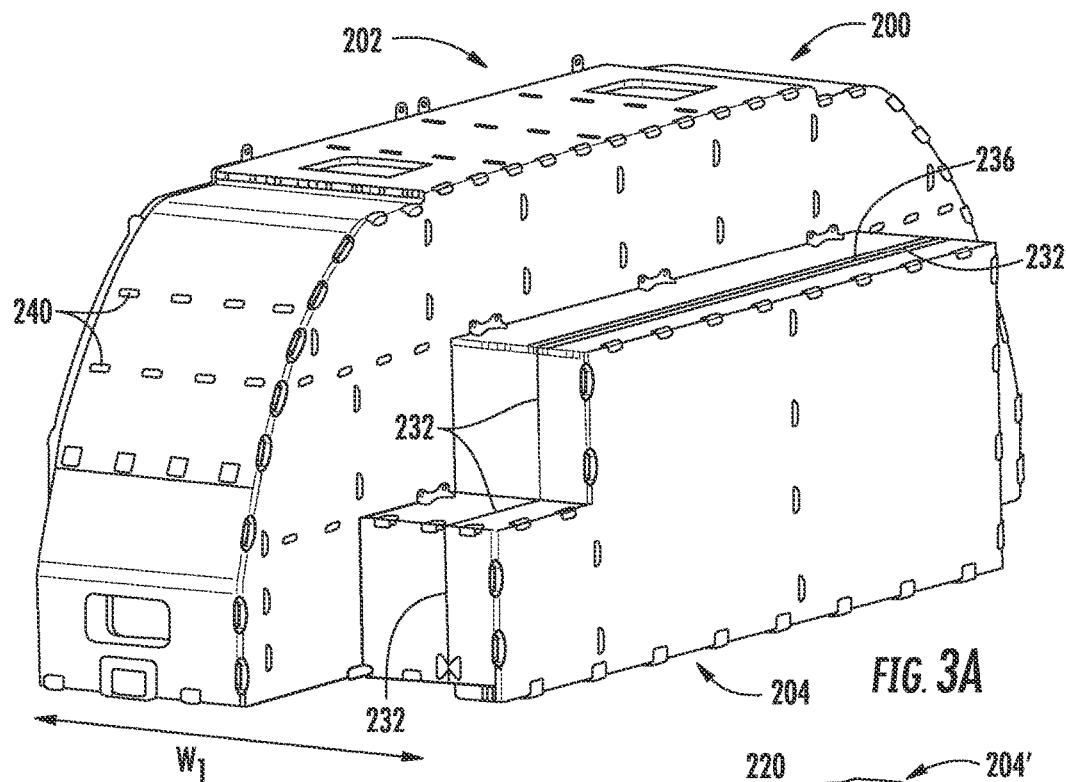
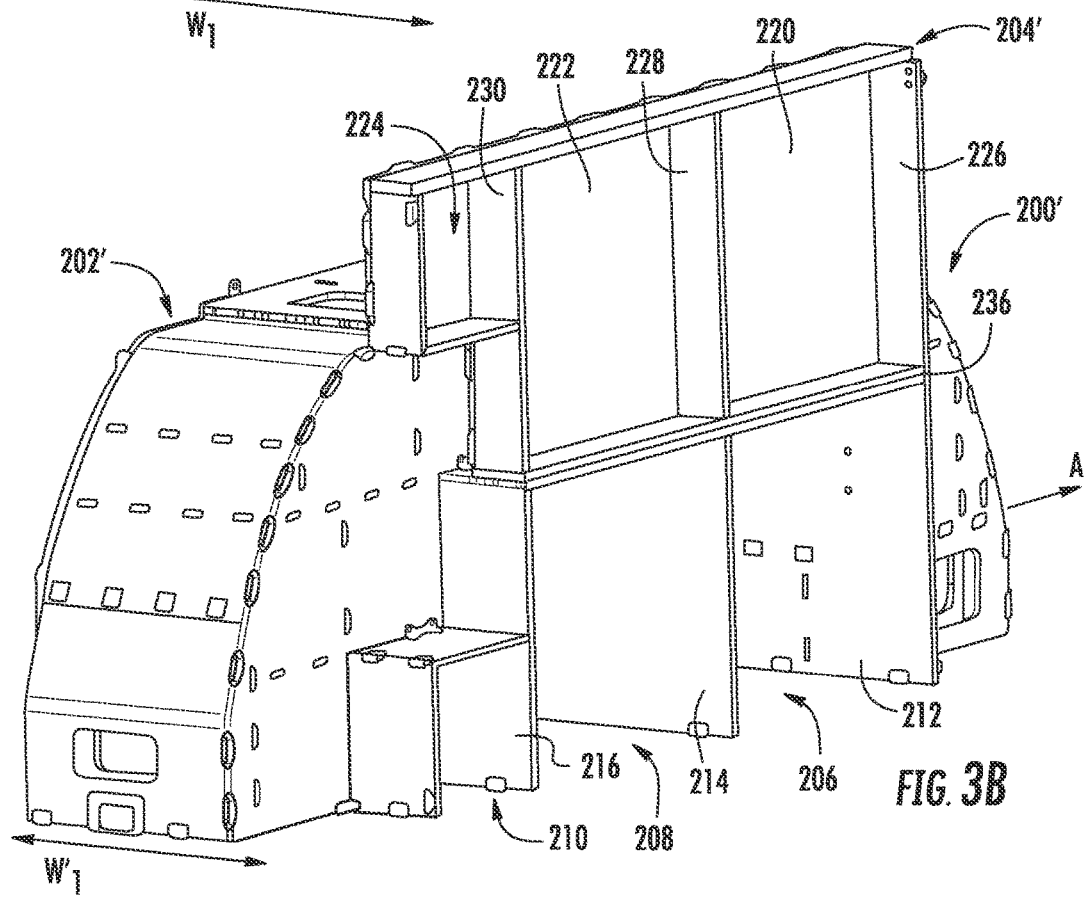

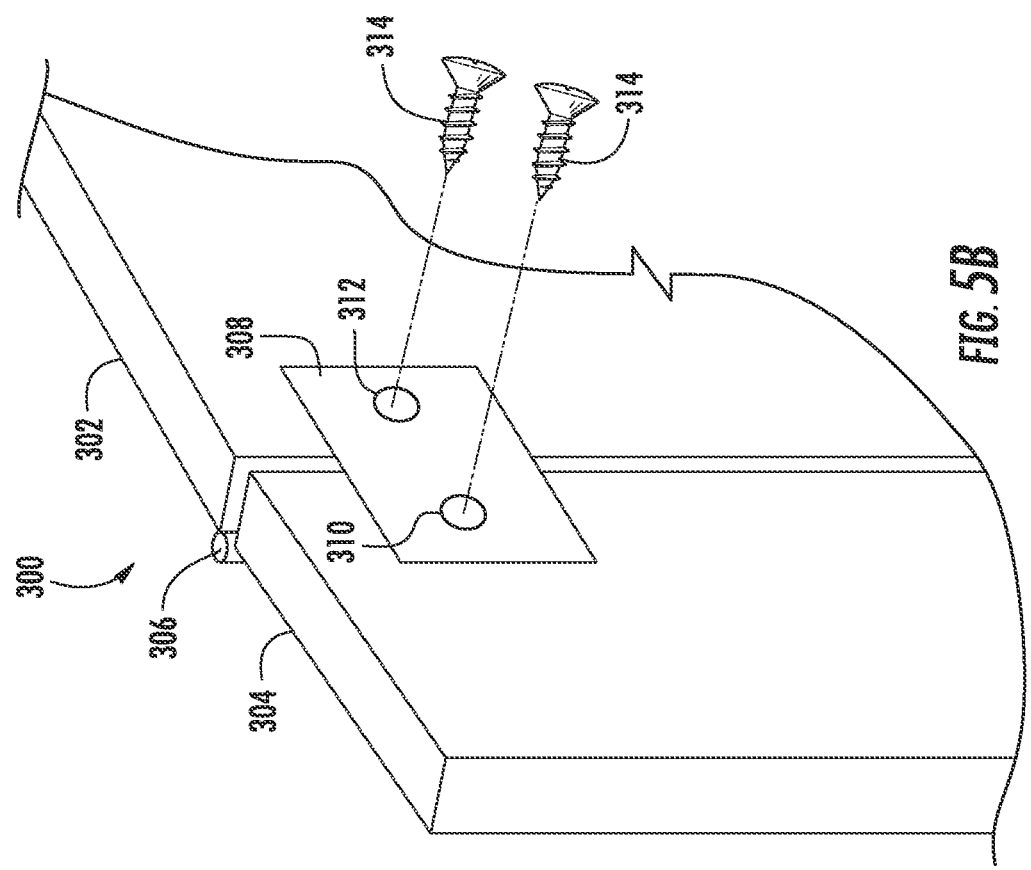
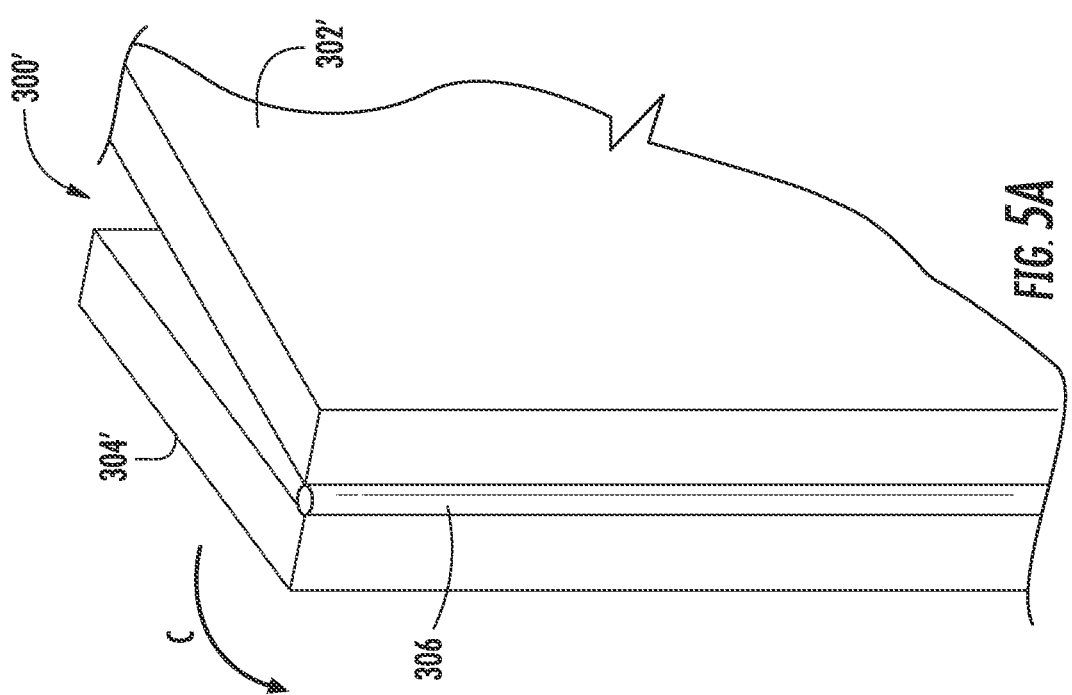

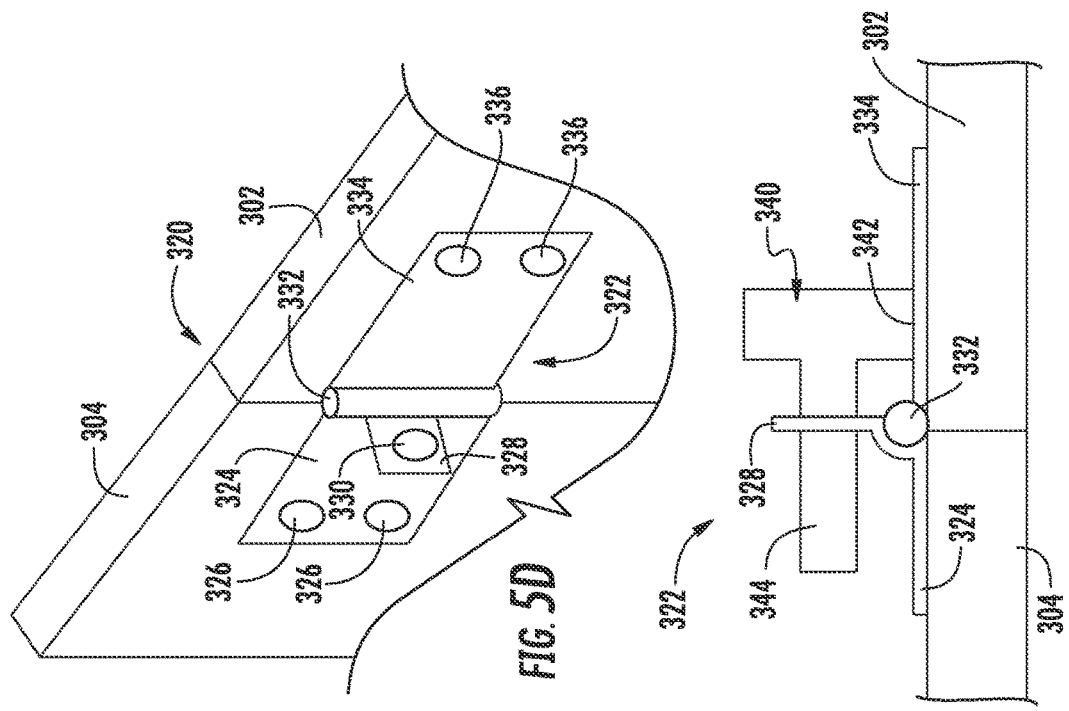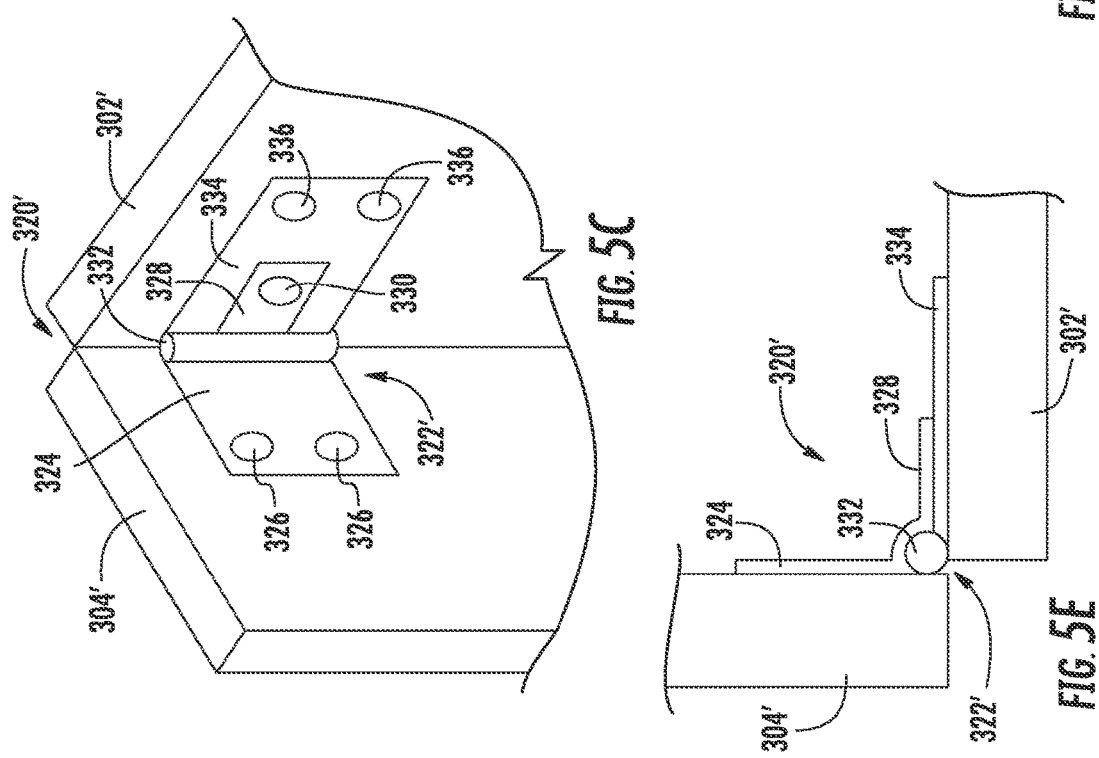

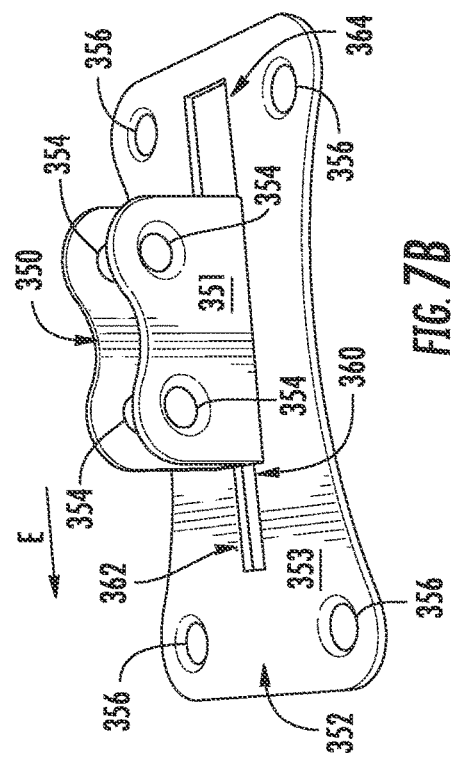
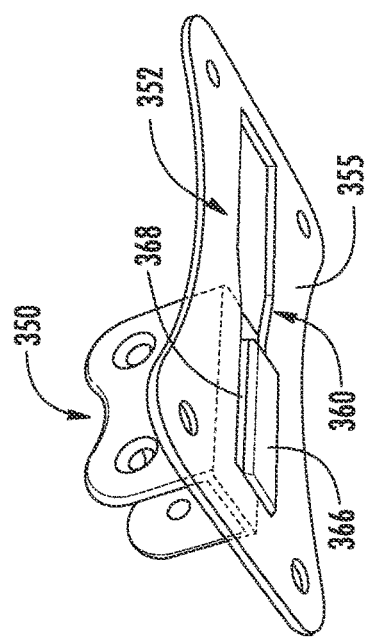
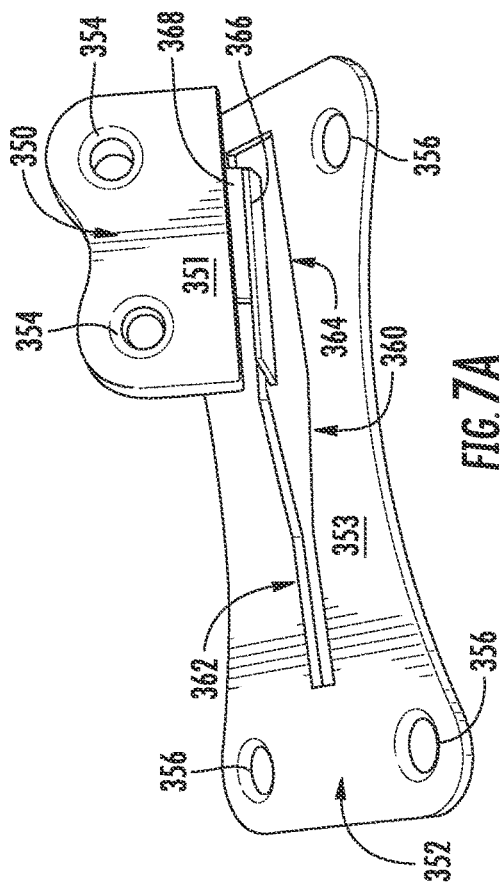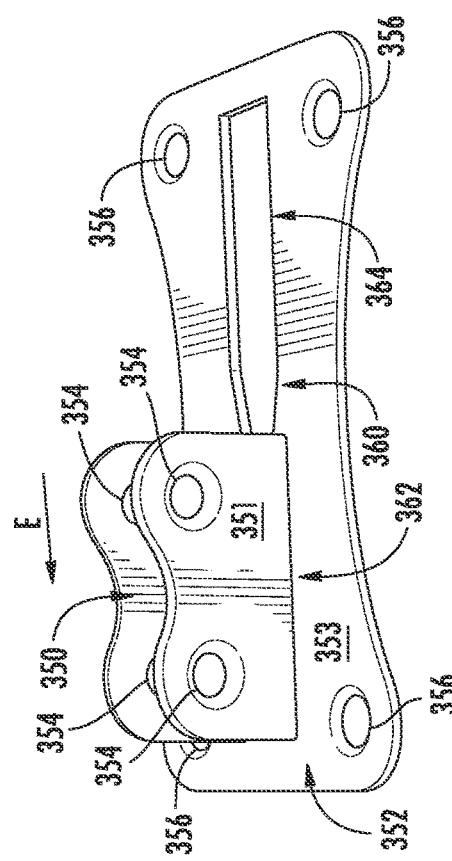
FIG. 7A
FIG. 7B
FIG. 7C
FIG. 7D

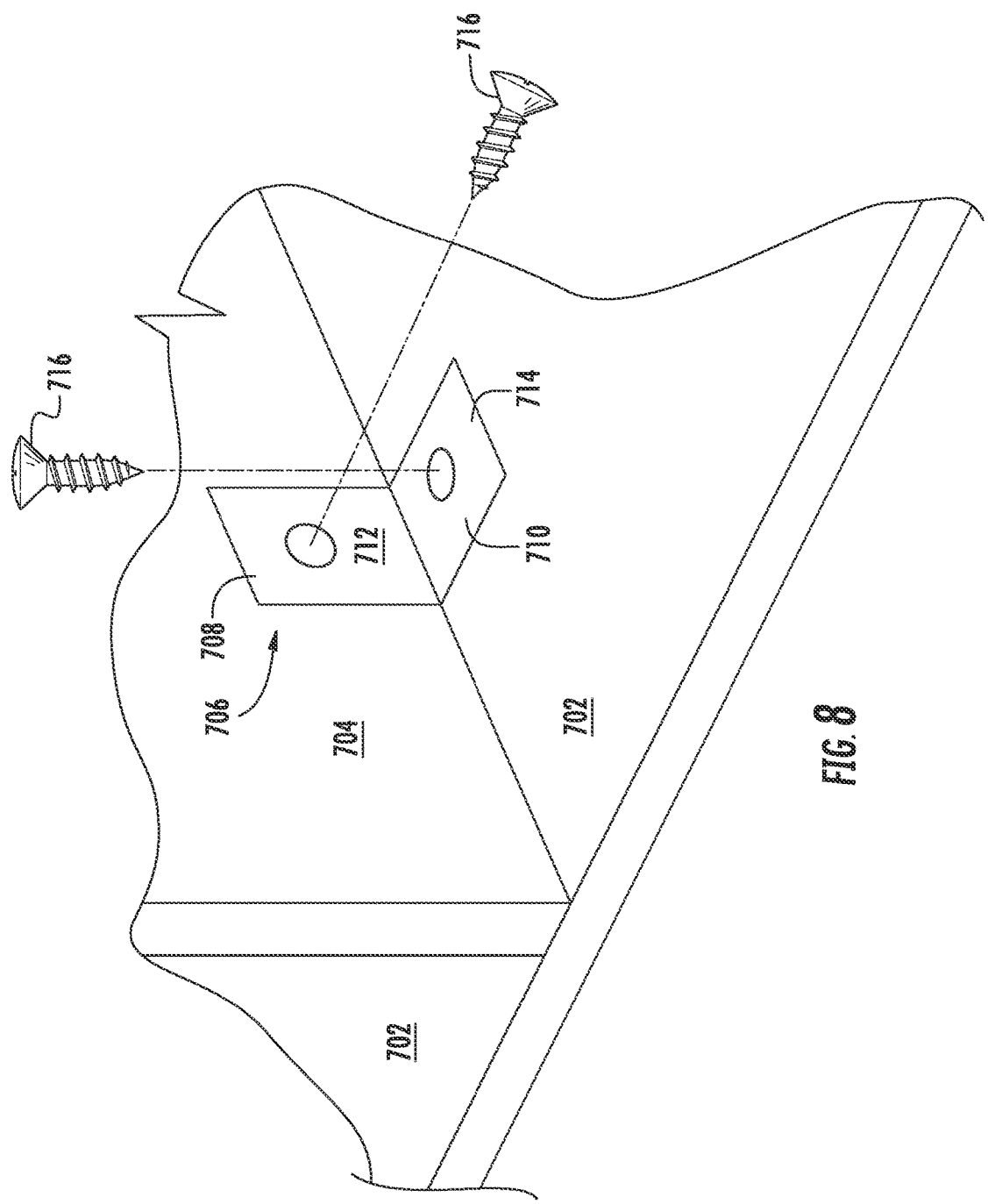

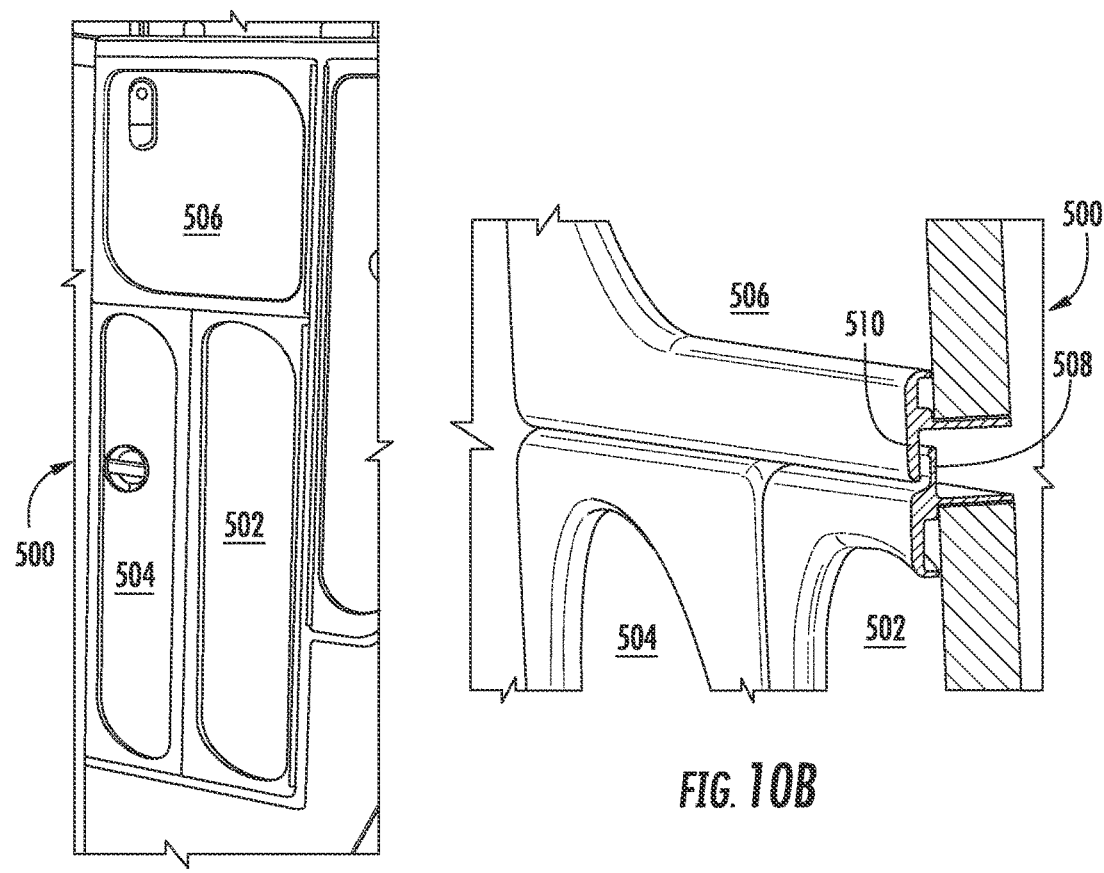
FIG. 10A
FIG. 10B
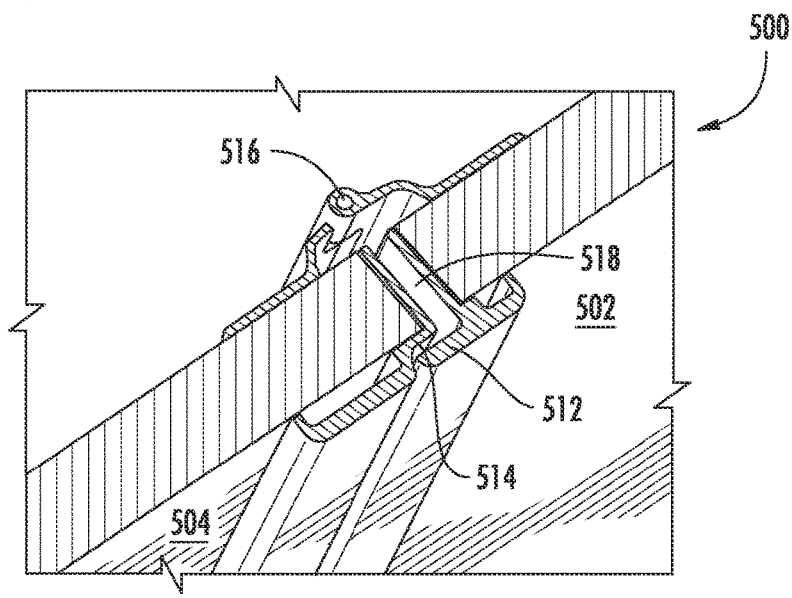
FIG. 10C

FOLDING GALLEY UNIT

BACKGROUND

Aspects described herein relate to foldable modular units, and more specifically, to modular units that can be folded for transport through a confined entryway.

SUMMARY

According to one aspect, a method for installing a modular unit is provided. The modular unit includes a first portion and a second portion. The second portion can rotate about a first hinge relative to the first portion between a first transit configuration and a first deployed configuration. The method includes inserting the modular unit through an entryway with the second portion in the first transit configuration, wherein the entryway defines a first dimension. The method also includes rotating the second portion about the first hinge to the first deployed configuration, wherein a dimension of the modular unit exceeds the first dimension when the second portion is in the first deployed configuration. The method also includes fixing the second portion in the first deployed configuration. The method also includes fixing the modular unit in an installed location.

According to one aspect, a modular unit includes at least one storage volume in the modular unit. The at least one storage volume includes a first portion that defines a first wall of the storage volume. The at least one storage volume also includes a second portion. The at least one storage volume also includes a first hinge connecting the first portion and the second portion, wherein the second portion is rotatable about the first hinge relative to the first portion between a first transit configuration and a first deployed configuration, wherein the second portion extends the first wall of the storage volume when in the first deployed configuration.

According to one aspect, a galley modular unit for an aircraft includes a first galley modular unit that includes a first portion and a second portion. The second portion can rotate about a first hinge relative to the first portion between a first transit configuration and a first deployed configuration. The first portion defines a first storage volume. The second portion extends the first storage volume when the second portion is in the first deployed configuration. The galley modular unit also includes a second galley modular unit that includes a third portion and a fourth portion. The fourth portion can rotate about a second hinge relative to the third portion between a second transit configuration and a second deployed configuration. The third portion defines a second storage volume. The fourth portion extends the second storage volume when the fourth portion is in the second deployed configuration. The second galley modular unit is stackable on top of the first galley modular unit. The galley modular unit also includes at least one fastener that couples the first galley modular unit and the second galley modular unit when the second galley modular unit is stacked on top of the first galley modular unit.

BRIEF DESCRIPTION OF THE SEVERAL VIEWS OF THE DRAWINGS

FIG. 2A is a schematic side view of a galley modular unit in the back of a pressure bulkhead of an aircraft cabin;

FIG. 2B is a schematic side view illustrating the galley modular unit divided into portions, wherein each portion can be partly folded to fit through a doorway into the aircraft cabin;

FIG. 3A is a perspective view of a first galley modular unit, wherein a first portion is rotated relative to a second portion into a deployed configuration;

FIG. 3B is a perspective view of the first the galley modular unit shown in FIG. 3A, wherein a first portion is rotated relative to a second portion into a transit configuration;

FIG. 5A is a detail perspective view of a first portion rotated about a hinge relative to a second portion of a modular unit into a transit configuration;

FIG. 5B is a detail perspective view of the first portion of FIG. 5A rotated about the hinge relative to the second portion into a deployed configuration, wherein the first portion and second portion are fixed by a fastener;

FIG. 5C is a detail perspective view of a first portion rotated about a hinge relative to a second portion of a modular unit in a transit configuration, wherein a hinge bracket includes an anti-rotation feature;

FIG. 5D is a detail perspective view of the first portion of FIG. 5C rotated about a hinge relative to a second portion of the modular unit in a deployed configuration, wherein the anti-rotation feature of the hinge bracket is positioned to accept an anti-rotation pin or the like;

FIG. 5E is a top view of the first portion of FIG. 5C rotated about the hinge relative to the second portion of the modular unit in the transit configuration;

FIG. 5F is a top view of the first portion of FIG. 5C rotated about the hinge relative to the second portion of the modular unit in the deployed configuration, wherein the anti-rotation feature of the hinge bracket is positioned to accept an anti-rotation pin, and wherein an anti-rotation pin is inserted through a hole in the anti-rotation feature of the hinge bracket;

FIGS. 7A-7D illustrate an aspect of a two-piece bracket that can be used to attach the first galley modular unit shown in FIGS. 3A and 3B to the second galley modular unit shown in FIGS. 4A and 4B;

FIG. 8 is a perspective view of an aspect of a bracket that can be used to attach the first galley modular unit shown in FIGS. 3 a and 3B to the second galley modular unit shown in FIGS. 4A and 4B;

FIGS. 10A-10C illustrate a bi-folding door and seals around gaps of the door;

DETAILED DESCRIPTION

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1:
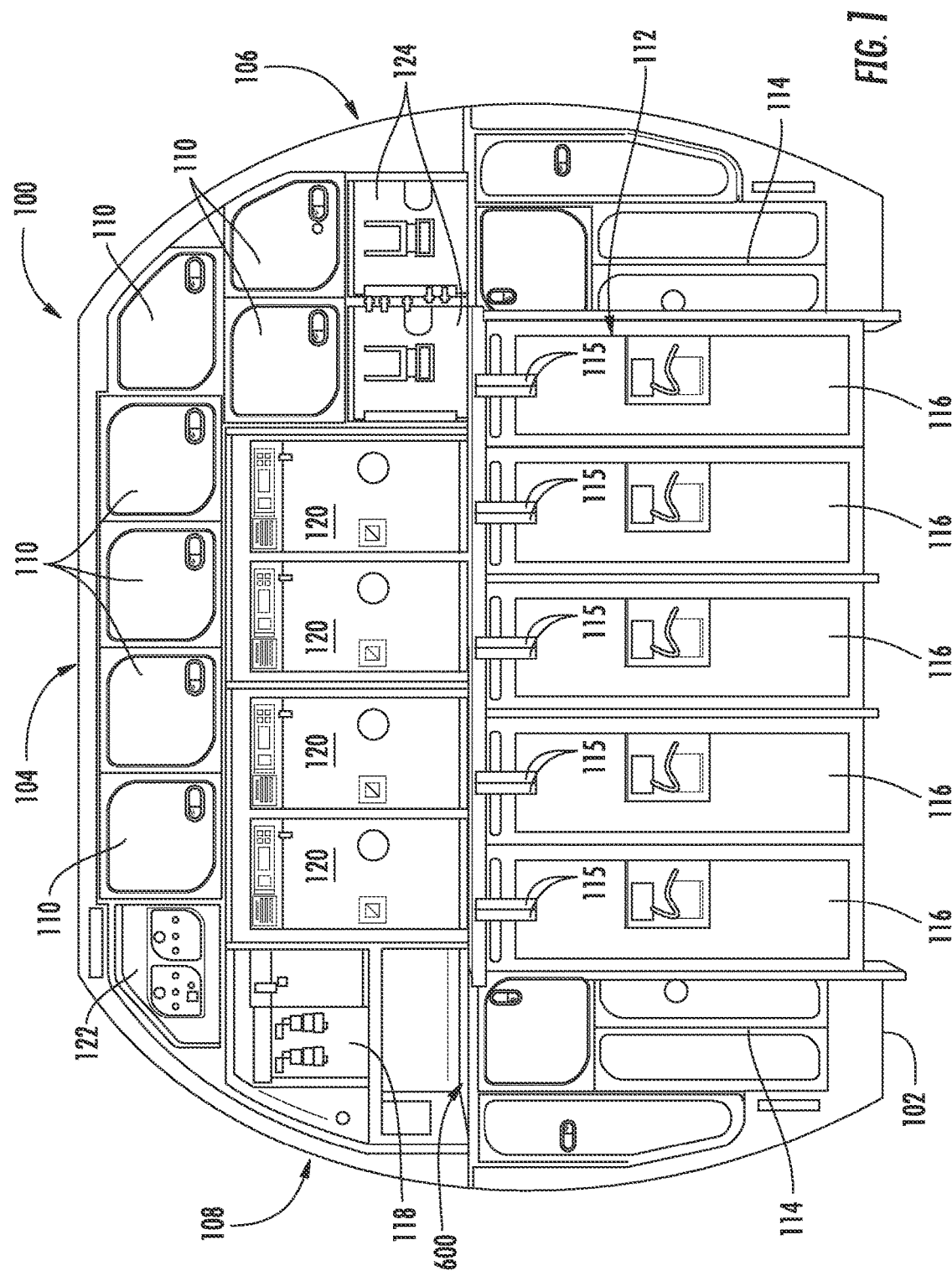
FIG. 1 is a front view of a galley modular unit that may be found at the back of a passenger cabin of an aircraft.

In a typical aircraft assembly process, galleys are often times assembled inside of the aircraft. FIG. 1 is a side view from the perspective of an aircraft cabin looking aft of a galley 100 that may be found at the rear of a passenger cabin of an aircraft. The galley 100 spans the entire rear of the passenger cabin. That is, a bottom portion 102 of the galley 100 is aligned with the floor of the passenger cabin, a top portion 104 is aligned with a ceiling of the passenger cabin, and side portions 106 and 108 of the galley 100 are aligned with walls of the passenger cabin. The galley 100 includes various volumes and kitchen units for use during a flight. For example the galley 100 could include multiple storage cubes 110 that can store various items, such as cups, napkins, and utensils that the flight crew may need during flight. The storage cubes 110 could also hold personal items belonging to the flight crew during the flight. At least some of the storage cubes 110 could be lockable. The galley could also include open bins 124. The galley 100 could also include various parking spaces 112 for service carts 116. The service carts 116 can hold drinks, snacks, and the like, and the service carts 116 can be moved along the aisles of the aircraft so that the flight crew can provide items to the passengers from the service carts 116. The galley 100 can include stops 115 that swivel to block the service carts 116 from exiting the parking spaces 112. The galley 100 can also include a water heater and/or coffee maker 118. The galley can include a drip tray 600 (discussed in greater detail below with reference to FIGS. 11A-11D) beneath the sink. The galley 100 could also include ovens 120 to heat food. In various aspects, the galley 100 is modular, meaning that the various volumes could be rearranged or reconfigured. The galley 100 could also include an electrical panel 122 (discussed in greater detail below with reference to FIGS. 12A-12C). For example, one or more of the ovens 120 could be removed and replaced with additional storage cubes 110.

During the assembly of some aircraft, the components of the galley 100 must be brought into the aircraft cabin through relatively small and/or confined aircraft doors. During the assembly of other aircraft, the galley 100 may be brought into the aircraft cabin through a temporary large opening in the aircraft body. However, such a temporary opening will not exist at a later time when the galley 100 may be removed for replacement, refurbishment, or the like. Typical galleys are made up of dozens or hundreds of individual pieces that are brought through the relatively small aircraft doors and assembled within the aircraft cabin. It can take two workers many hours over one or two days to attach the many individual pieces with screws, bolts, and/or other fasteners to assemble the galley unit 100.

In various aspects described herein, a galley is made up of one or more modular galley units that are pre-assembled. The modular galley units include portions that are attached to each other with a hinge. The hinge allows the portions to rotate relative to each other between a transit configuration and a deployed configuration. In the transit configuration, the modular galley unit has dimensions that fit through an entry door, which may be a confined entryway, into the aircraft cabin. In the deployed configuration, the modular galley unit does not fit through the entry door into the aircraft cabin. After the modular galley units have been brought through the entry door in the transit configurations, the portions can be rotated about the hinges to the deployed configurations and secured in the deployed configurations. The modular galley units can be assembled together with a relatively small number of bolts, screws, and/or other fasteners to complete the assembly of the galley. In various tests, modular galley units according to various aspects described herein have been assembled in as little as 10 minutes.

FIG. 2A is a schematic side view of a pressure bulkhead 150 of an aircraft. The aircraft cabin lies within the pressure bulkhead. The pressure bulkhead 150 includes a generally hemisphere-shaped aft portion 154. The pressure bulkhead 150 also includes an entry door 152 there through. FIG. 2A illustrates a galley 160 installed within the pressure bulkhead 150 and immediately forward of the aft portion 154 of the pressure bulkhead 150. The galley 160 can include aft protrusions 161 that take advantage of otherwise wasted space in the volume defined by the hemisphere-shaped aft portion 154. Although FIG. 2A is not intended to be to scale, it is readily apparent that the galley 160 would not fit through the entry door 152.

FIG. 2B illustrates a schematic side view of the galley 160 being inserted into the aircraft as to galley modular units. The galley 160 is made up of a first galley modular unit 162 and a second galley modular unit 164. Again, although FIG. 2B is not intended to be to scale, as drawn, even though the galley modular units 162 and 164 are smaller than the galley 160, it is apparent that the galley modular units 162 and 164 will not fit through the entry door 152. Specifically, the galley modular units 162 and 164 are too wide to fit through the entry door 152. The first galley modular unit 162 includes a portion 166 and a second portion 168. As shown at the right hand region of FIG. 2B, the first galley modular unit 162 is in a deployed configuration. In the middle region of FIG. 2B, the second portion 168' has been rotated relative to the first portion 166' (about a hinge) so that the first galley modular unit 162' is in a transit configuration. In the transit configuration, the first galley modular unit 162' is narrower than in the deployed configuration such that the first galley modular unit 162' can fit through the entry door 152. Similarly, the second galley modular unit 164 includes a third portion 172 and a fourth portion 170. As shown at the right hand region of FIG. 2B, the second galley modular unit 164 is in a deployed configuration. In the middle region of FIG. 2B, the fourth portion 170' has been rotated relative to the third portion 172' (e.g., the fourth portion 170' has been rotated in a manner such that it is not visible in the middle portion of FIG. 2B) such that the second galley modular unit 164' can fit through the entry door 152.

FIG. 3A is a rear-facing perspective view of a first galley modular unit 200 of a galley (e.g., galley 100 shown in FIG. 1) in a deployed configuration. FIG. 3B is a rear-facing perspective view of the first galley modular unit 200' in a transit configuration. Referring primarily to FIG. 3A, the first galley modular unit 200 includes a first portion 202 and a second portion 204. The first portion 202 and the second portion 204 can each be made up of many individual pieces that were preassembled away from the aircraft. For example, in various instances, the individual pieces may have been assembled using screws, bolts, or other fasteners 240. In various instances, the individual pieces may be assembled using an injectable tab and slot construction, in which a tab of a first piece is inserted into a slot of a second piece. Thereafter, a resin, epoxy, or the like can be injected through holes into the slot. When the resin, epoxy, or the like cures, the tab will be rigidly retained in the slot. Referring to FIG. 3B, the first portion 202 of the first galley modular unit 200 defines several storage volumes. For example, the first galley modular unit 200 defines a first storage volume 206, a second storage volume 208, and a third storage volume 210. In various aspects, the first storage volume 206 and the second storage volume 208 could house the ovens 120, shown in FIG. 1, for example. In various aspects, the third storage volume 210 could be a storage volume 110 or an open bin 124, shown in FIG. 1, for example. The first storage volume 206 is partly defined by wall 212 of the first galley modular unit 200. The second storage volume 208 is partly defined by wall 214 of the first galley modular unit 200. The third storage volume 210 is partly defined by wall 216 of the first galley modular unit. Other walls (some of which are not visible in FIG. 3B) also define the storage volumes 206, 208, and 210. It is readily apparent from FIG. 3B that the second portion 204 of the first galley modular unit 200 defines extensions for the several storage volumes 206, 208, and 210 when the second portion 204' is returned to the deployed configuration shown in FIG. 3A. For example, an extended volume 220 for the first storage volume 206 is partly defined by wall 226 of the second portion 204'. An extended volume 222 for the second storage volume 208 is partly defined by wall 228 of the second portion 204'. An extended volume 224 for the third storage volume 210 is partly defined by wall 230 of the second portion 204'. Again, other walls (some of which are not visible in FIG. 3B) also define the extended volumes 220, 222, and 224.

The first portion 202 and the second portion 204 are connected by a hinge 236. FIG. 3A illustrates the second portion 204 rotated about the hinge 236 relative to the first portion 202 in a deployed configuration. In the deployed configuration, the first galley modular unit 200 has a width $W_1$, which may be too wide to fit through an entry door for the aircraft. FIG. 3B illustrates the second portion 204' rotated about the hinge 236 relative to the first portion 202' in a transit configuration. In the transit configuration, the first modular galley unit 200' has a width $W_1'$, which is narrower than the width $W_1$ in the deployed configuration shown in FIG. 3A, which allows the first galley modular unit 200 to fit through an entry door. For reference, the first galley modular unit 200 would be moved through the entry door in the direction of arrow A or in the direction opposite to arrow A. It is readily apparent from FIG. 3B that in the deployed configuration shown in FIG. 3A, the extended volumes 220, 222, and 224 are added to the storage volumes 206, 208, and 210, respectively, resulting in larger storage volumes. For example, wall 226 of the second portion 204 can align with the wall 212 of the first portion to define a first extended storage volume 206. Wall 228 of the second portion 204 can align with the wall 214 of the first portion 202 to define a second extended storage volume 208. Wall 230 of the second portion 204 can align with the wall 216 of the first portion 200 and to define a third extended storage volume 210.

Referring again to FIG. 3A, in the deployed configuration, a seam 232 is present between the first portion 202 and the second portion 204 of the first galley modular unit 200. In various instances, the seam 232 may be filled with a sealant that would prevent any liquids (e.g., coffee, soda, water) that may be spilled on the galley from leaking behind the galley.

Figure 4A:
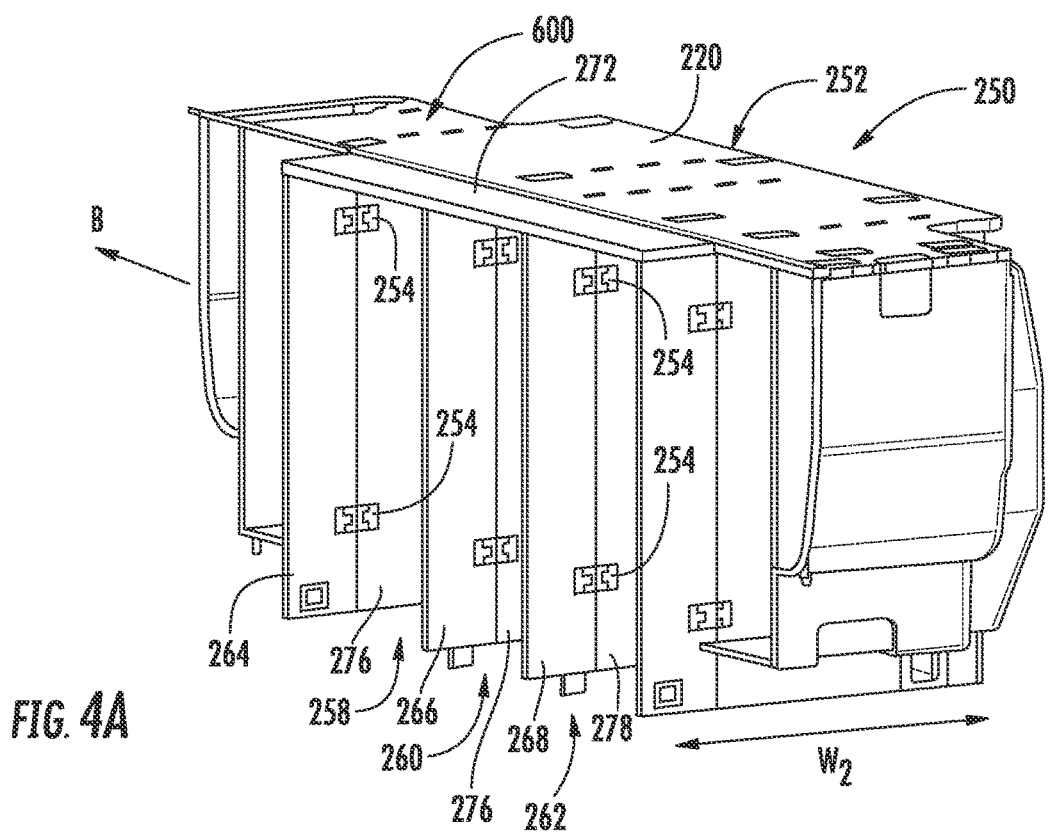
FIG. 4A is a perspective view of a second galley modular unit, wherein a third portion is rotated relative to a fourth portion into a deployed configuration.
Figure 4B:
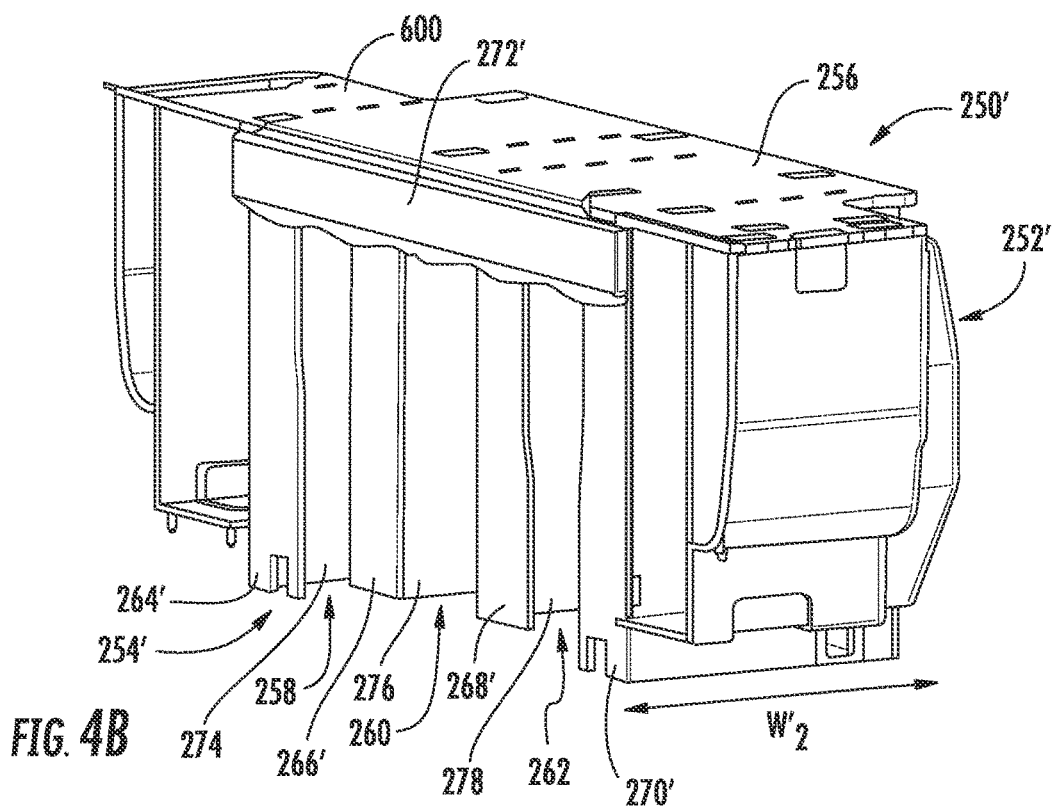
FIG. 4B is a perspective view of the second galley modular unit shown in FIG. 4A, wherein the third portion is rotated relative to the fourth portion into a transit configuration.

FIG. 4A is a front-facing perspective view of a second galley modular unit 250 of a galley (e.g., galley 100 shown in FIG. 1) in a deployed configuration. FIG. 4B is a front-facing perspective view of the second galley modular unit 250' in a transit configuration. Referring primarily to FIG. 4A, the second galley modular unit 250 includes a third portion 252, a fourth portion 264, a fifth portion 266, a sixth portion 268, a seventh portion 270, and an eighth portion 272. The third portion 252 may be made up of several individual pieces that are fastened together (described above). The fourth portion 264, the fifth portion 266, the sixth portion 268, the seventh portion 270, and the eighth portion 272 can be attached to the third portion 252 by various hinges. The second galley modular unit 250 can define several storage volumes therein. For example, wall 274 partly defines a fourth storage volume 258, wall 276 partly defines a fifth storage volume 260, and wall 278 partly defines a sixth storage volume 262. In various aspects, the fourth storage volume 258, fifth storage volume 260, and sixth storage volume 262 could be parking spaces 112 for service carts 116 (shown in FIG. 1), for example. Other walls (some of which are not visible in FIGS. 4A and 4B) also define the storage volumes. As shown in FIG. 4A, the fourth portion 264 extends wall 274 when in the deployed configuration, thereby extending the fourth storage volume 258. The fifth portion 266 extends wall 276 when in the deployed configuration, thereby extending the fifth storage volume 260. The sixth portion 268 extends wall 278 when in the deployed configuration, thereby extending the sixth storage volume 262. The seventh portion 270 extends a wall opposite of wall 278 when in the deployed configuration, thereby also extending the sixth storage volume 262. The eighth portion 272 extends a ceiling of the fourth storage volume 258, the fifth storage volume 260, and the sixth storage volume 262 when in the deployed configuration. The eighth portion 272 also extends a top surface 280 on the third portion 252 of the second galley modular unit 250 when in the deployed configuration.

As shown in FIG. 4A, the second galley modular unit 250 has a width $W_2$ in the deployed configuration, which may be wider than the entry door to the aircraft. For reference, the second galley modular unit 250 would be moved through the entry door in the direction of arrow B or in a direction opposite to the arrow B. FIG. 4B shows the fourth portion 264', the fifth portion 266', the sixth portion 268', the seventh portion 270', and the eighth portion 272' rotated about hinges 254 to a transit configuration such that the second galley modular unit 250' has a narrower width $W_2'$ that fits through the entry door.

As discussed above, the first galley modular unit 200 and the second galley modular unit 250 can have various portions rotated to transit configurations to allow the galley modular units to pass through the entry door to the aircraft. After the galley modular units are within the passenger compartment, the various portions are rotated to deployed configurations, which provide maximized dimensions for various storage volumes within the galley. FIGS. 5A and 5B illustrate an aspect of a bracket by which portions of the galley modular units may be fixed in the deployed configuration once the galley modular units are in the passenger cabin. FIG. 5A depicts a first portion 302' and a second portion 304' of a modular unit 300' in a transit configuration. The second portion 304' is rotated in the direction of arrow C about a hinge 306 to reach the deployed configuration shown in FIG. 5B. After the second portion 304 has been rotated to the deployed configuration, the first portion 302 and the second portion 304 can be fixed relative to one another with a bracket 308. The bracket 308 can include a first hole 310 and a second hole 312. A first fastener 314 (e.g., a screw, a bolt, a rivet, or the like) can be inserted through the first hole 310 and secured in the second portion 304. A second fastener 314 can be inserted through the second hole 312 and secured in the first portion 302. The bracket 308 and the fastener 314 can fix the first portion 302 and the second portion 304 in the deployed configuration.

FIGS. 5C-5F illustrate another aspect of a bracket by which portions of the galley modular units may be fixed in the deployed configuration once the galley modular units are in the passenger cabin. FIGS. 5C and 5E illustrate a first portion 302' and a second portion 304' of a modular unit 320' in a transit configuration. The second portion 304' is rotated about a hinge 332 of a hinge bracket 322'. The hinge bracket 322' includes a first bracket plate 334, which rests against the first portion 302'. The hinge bracket 322' includes a second bracket plate 324, which rests against the second portion 304'. The first bracket plate 334 includes holes 336 that can receive screws, bolts, and/or other fasteners to secure the first bracket plate 334 to the first portion 302'. The second bracket plate 324 includes holes 326 that can receive screws, bolts, and/or other fasteners to secure the second bracket plate 324 to the second portion 304'. The second bracket plate 324 is rigidly connected to an anti-rotation plate 328. The anti-rotation plate 328 includes a hole 330 therethrough. When the first portion 302' and the second portion 304' are in the transit configuration shown in FIGS. 5C and 5E, the anti-rotation plate 328 may rest against the first bracket plate 334. Referring to FIGS. 5D and 5F, when the second portion 304 is rotated about the hinge 332 relative to the first portion 302 to the deployed configuration, the anti-rotation plate 328 rotates about the hinge 332 relative to the first bracket plate 334. When the first portion 302 and the second portion 304 of the modular unit 320 are in the deployed configuration, the anti-rotation plate 328 extends away from the first bracket plate 334 and the second bracket plate 324. A pin 340 or the like may be inserted through the hole 330 in the anti-rotation plate 328. The pin 340 can include a shaft 344 that passes through the hole 330 and a head 342 that contacts the first bracket plate 334. The pin 340 prevents the second bracket plate 324 and the anti-rotation plate 328 from rotating about the hinge 332 relative to the first bracket plate 334. As a result, the second portion 304 is prevented from rotating about the hinge 332 relative to the first portion 302. In various aspects, the pin 340 can include a cotter pin, a split pin, or other feature that prevents the pin 340 from backing out of the hole 330 in the anti-rotation plate 328.

Figure 6:
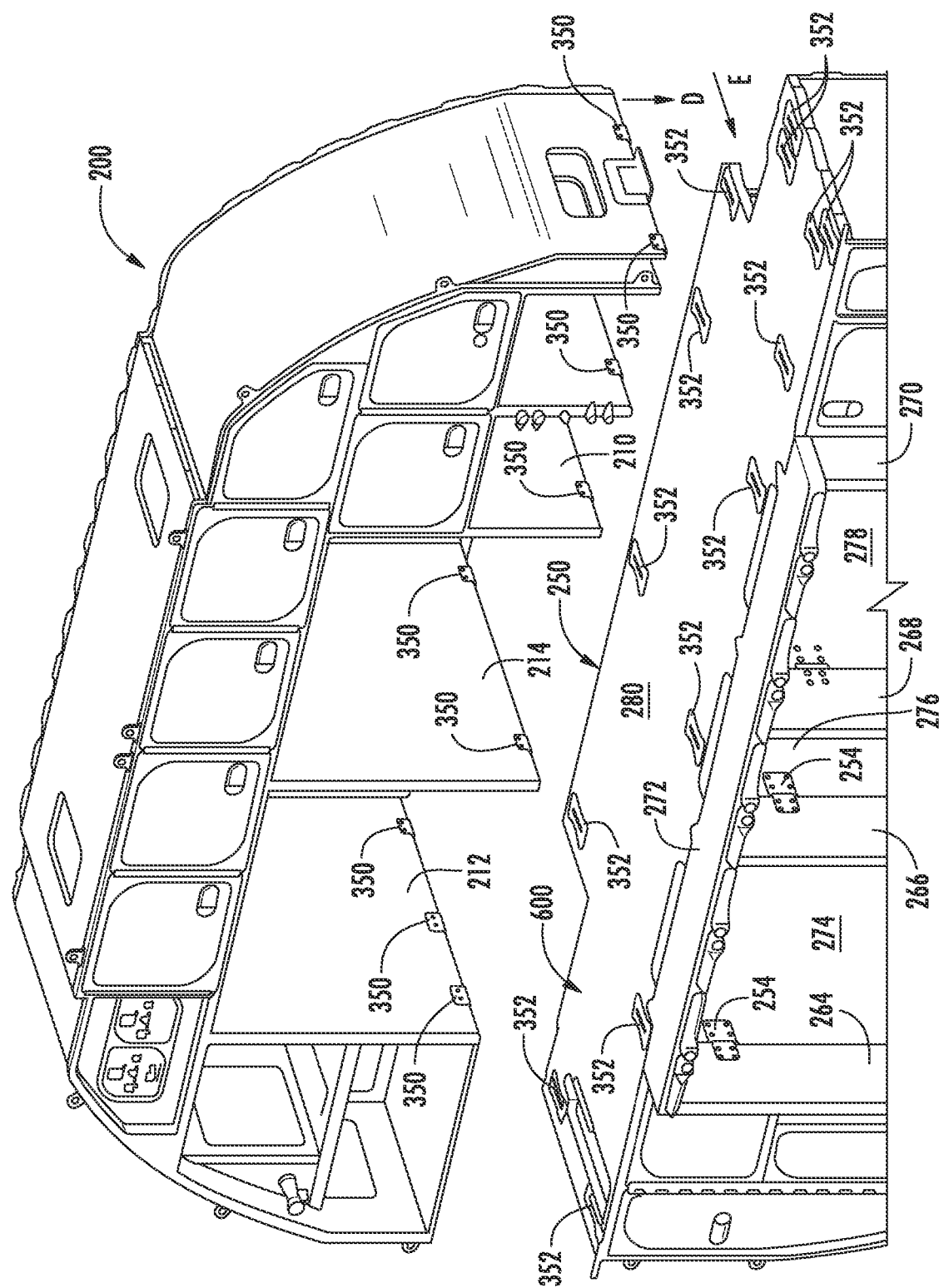
FIG. 6 is a perspective view of the first galley modular unit shown in FIGS. 3A and 3B being arranged on top of the second galley modular unit shown in FIGS. 4A and 4B.

Referring now to FIG. 6, after the first galley modular unit 200 and the second galley modular unit 250 have been transported into the aircraft cabin and the various portions have been unfolded to the deployed configuration, the first galley modular unit 200 and the second galley modular unit 250 can be assembled. The first galley modular unit 200 can be placed on top of the second galley modular unit 250 as indicated by arrow D. In various aspects, slide locks can be used to attach the first galley modular unit 200 to the second galley modular unit 250. A first part 350 of the slide lock can be attached to the first galley modular unit 200 and a second part 352 of the slide lock can be attached to the second galley modular unit 250. FIGS. 7A-7C provide detail views of a slide lock. The first part 350 of the slide lock includes a bracket 351. The bracket 351 includes holes 354 that can receive screws, bolts, and/or other fasteners to secure the bracket 351 to a panel of the first galley modular unit 200. The bracket 351 can be installed on the first galley modular unit 200 prior to the first galley modular unit 200 being brought onboard the aircraft. The first part 350 of the slide lock also includes a neck 368 extending from the bracket 351 and a tab 366 extending from the neck 368. The tab 366 is wider than the neck 368. The second part 352 of the slide lock includes a plate 353 with holes 356 there through. The holes 356 in the plate 353 can receive screws, bolts, and/or other fasteners to secure the plate 353 to a panel of the second galley modular unit 250. The plate 353 also includes a slot 360. The slot 360 includes a wide region 364 at one end and a narrow region 362 at a second opposing end. The tab 366 on the first part 350 of the slide lock fits through the wide region 364 of the slot 360. When the first galley modular unit 200 is brought down on to the second galley modular unit 250 in the direction of arrow D, the tabs 366 of the first part 350 of the slide locks pass through the wide region 364 of the slots 360. Thereafter, the first galley modular unit 200 can slide forward (in the direction of arrow E) relative to the second galley modular unit 250, causing the first parts 350 of the slide locks to slide relative to the second parts 352 of the slide locks. FIG. 7B illustrates the tab 366 of the first part 350 of the slide lock engaged in the slot 360 of the second part 352 of the slide lock and with the first part 350 having partially slid toward the narrow region 362 of the slot 360. The neck 368 of the first part 350 of the slide lock is narrow enough to fit in the narrow region 362 of the slot 360 when the first part 350 of the slide locks slides relative to the second part 352. The tabs 366 are wider than the narrow region 362 of the slots 360. As a result, after the first galley modular unit 200 is moved in the direction of arrow E relative to the second galley modular unit 250, the tabs 366 of the first part 350 of the slide lock are captured by the plate 353 of the second part 352, preventing the first galley modular unit 200 from being removed from the second galley modular unit 250. FIG. 7C illustrates the first part 350 of the slide lock fully engaged with the narrow region 362 of the slot 360 of the plate 353. FIG. 7D illustrates the opposite side 355 of the plate 353 with the first part 350 of the slide lock fully engaged with the narrow region 362 of the slot 360 such that the tab 366 is captured by the plate 353. An additional bracket (such as the bracket illustrated in FIG. 8, discussed below) can be attached to the first galley modular unit 200 and the second galley modular unit 250 to ensure that the first galley modular unit 200 does not slide in a direction opposite arrow E relative to the second galley modular unit 250 such that the slide locks could disengage.

Referring again to FIG. 6, the first galley modular unit 200 can be secured to the second galley modular unit 250 by other means. For example, FIG. 8 illustrates a panel 702 of a second galley modular unit that is attached to a panel 704 of a first galley modular unit with a bracket 706. The bracket 706 includes a first plate 708 that abuts the panel 704 of the first galley modular unit and a second plate 710 that abuts the panel 702 of the second galley modular unit. The first plate 708 includes a first hole 712 and the second plate 710 includes a second hole 714. The holes 712 and 714 can receive fasteners 716 (e.g., screws, bolts, rivets, or the like) that secure the bracket 706 to the panel 702 and 704.

Figure 9A:
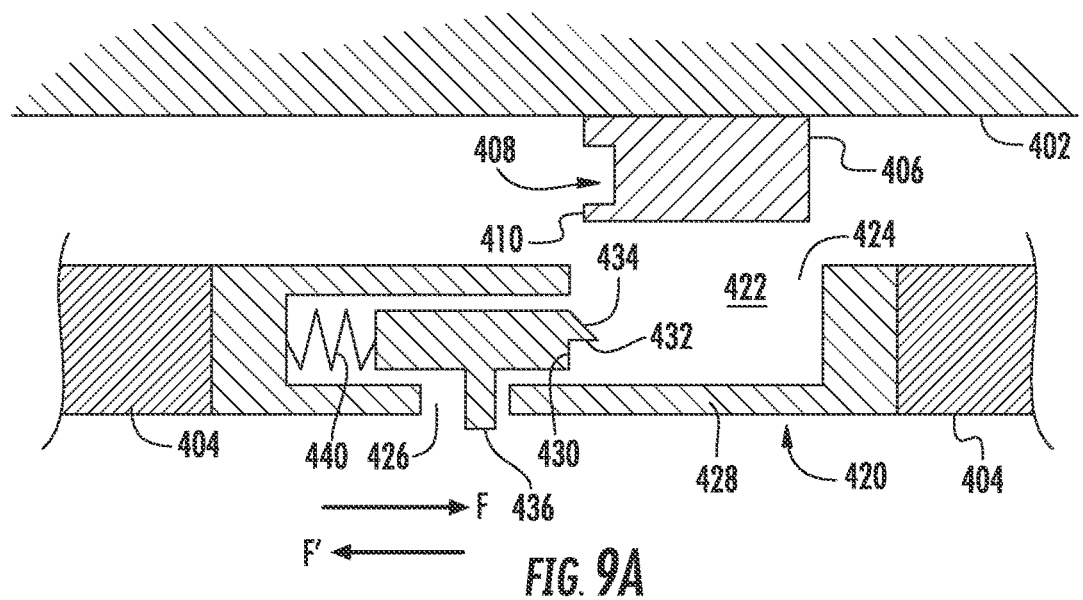
FIGS. 9A-9C illustrates an aspect of a two-piece bracket that can be used to attach the first galley modular unit shown in FIGS. 3A and 3B to the second galley modular unit shown in FIGS. 4A and 4B.
Figure 9B:
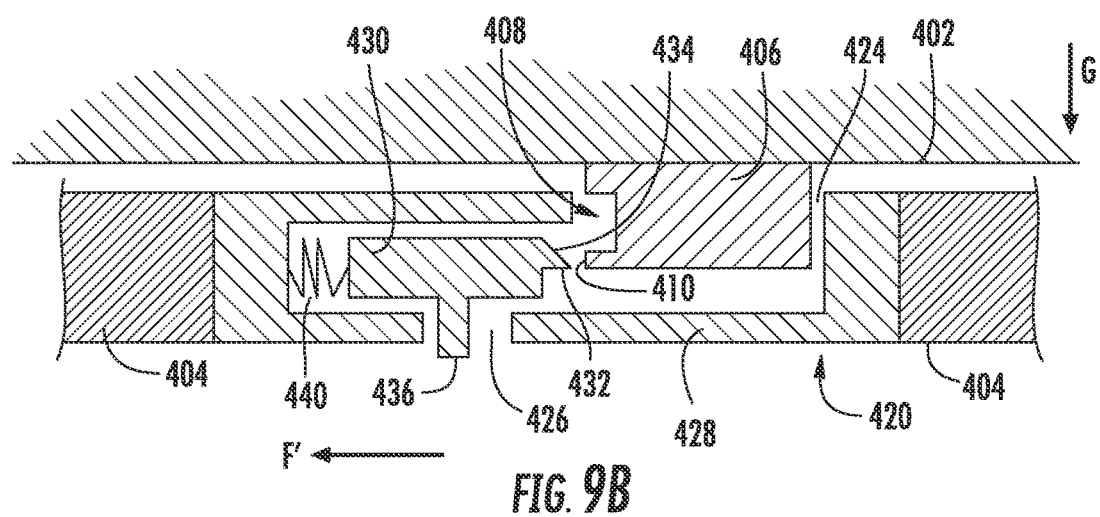
Figure 9C:
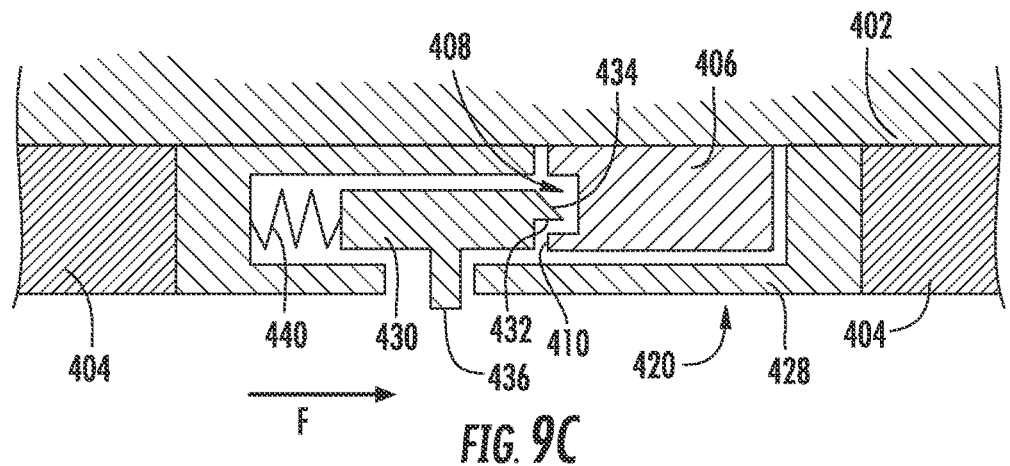

FIGS. 9A-9C illustrate another arrangement for securing a first galley modular unit (e.g., the first galley modular unit 200) to a second galley modular unit (e.g., the second galley modular unit 250). A first panel 402 of the first galley modular unit includes a latch 406. The latch 406 includes a notch 408 and a ledge 410 on a first side. A second panel 404 of the second galley modular unit includes a latch assembly 420. The latch assembly 420 includes a plunger 430 that is urged toward a cavity 422 (in the direction of arrow F) by a biasing member 440 (e.g., a spring). The plunger 430 includes an angled surface 434 and a flat surface 432 that extend into the cavity 422. As shown in FIG. 9B, when the first panel 402 is moved toward the second panel 404 (in the direction of arrow G), the latch 406 can pass through an opening 424 into the cavity 422 in the latch assembly 420 and can contact the angled surface 434 of the plunger 430, causing the plunger 430 to move in the direction of arrow F'. Now referring to FIG. 9C, when the first panel 402 contacts the second panel 404, the notch 408 in the latch 406 is aligned with the angled surface 434 and the flat surface 432 of the plunger 430, enabling the biasing member 440 to push the plunger 430 in the direction of F. As shown in FIG. 9C, the flat surface 432 of the plunger 430 and the ledge 410 of the latch 406 overlap such that the latch 406 cannot be withdrawn from the cavity 422.

The latch assembly 420 can include an opening 426 on an opposite side from the opening 424 in which the latch 406 enters. The plunger 430 can include a finger 436 that is accessible through the opening 424. In the event that the first panel 402 is to be separated from the second panel (e.g., the first galley modular unit 200 is to be removed from the second galley modular unit 250) the finger 436 can be urged in the direction of arrow F' to move the plunger 430 away from the latch 406. As a result, the ledge 410 of the latch 406 will not overlap with the flat surface 432 of the plunger 430, and the latch 406 can be removed from the cavity 422.

Referring again to FIG. 1, a galley 100 may include bi-fold doors 114 that enable access in tight spaces. For example, the galley 100 is often located immediately aft of entry doors (e.g., entry door 152 shown in FIGS. 2A and 2B), and emergency slide mechanisms associated with the entry doors may interfere with space that would be needed by a full-sized door. In various instances, the bi-fold doors 114 may cover a compartment used to store trash. According to various regulations, such a compartment should include seals that would prevent air from entering the compartment in the event of a fire. FIGS. 10A through 10C illustrate a bi-fold door 500 according to various aspects. FIG. 10A shows a bi-fold door 500 with a first panel 502 and a second panel 504. A full-sized door 506 is arranged above the bi-fold door 500 (e.g., the slide mechanism is located below the full-sized door 506 such that the full-sized door 506 can be fully opened). Referring to FIG. 10B, the bi-fold door panels 502 and 504 include a lip seal 508 that extends above the panels 502 and 504. The full-sized door 506 includes a lip 510 that extends below the full-sized door 506 and that overlaps with the lip seal 508 that extends above the panels 502 and 504. The lip seals 508 and 510 can be made of resilient materials (e.g., rubber or a soft plastic) that can compliantly deform and seal against one another. Referring to FIG. 10C, the panels 502 and 504 are connected to each other by a hinge 516. A gap 518 between the panels 502 and 504 can be covered by a seal formed therebetween. For example, panel 504 can include a compliant member 514 along the gap. Panel 502 can include a lip 512 that extends toward the compliant member 514 and overlaps with the compliant member 514 when the bi-fold door 500 is closed. Again, the compliant member 514 and the lip 512 can be made of resilient materials (e.g., rubber or a soft plastic) that can compliantly deform and seal against one another. The above-described seals can reduce the amount of air that can enter the compartment behind the bi-fold door 500 so that any fire in the compartment would be starved of oxygen and would be extinguished.

Figure 11A:
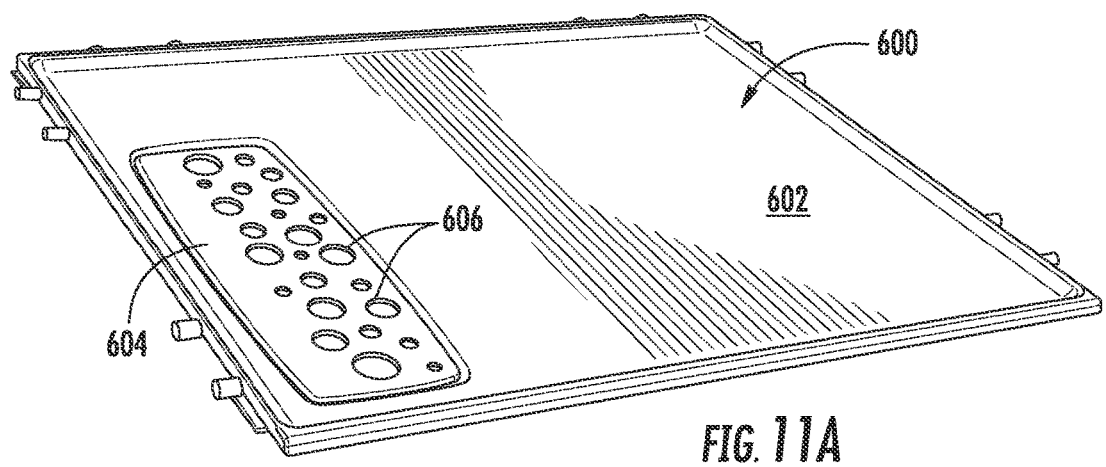
FIG. 11A is a top perspective view of a screen covering a drain.
Figure 11B:
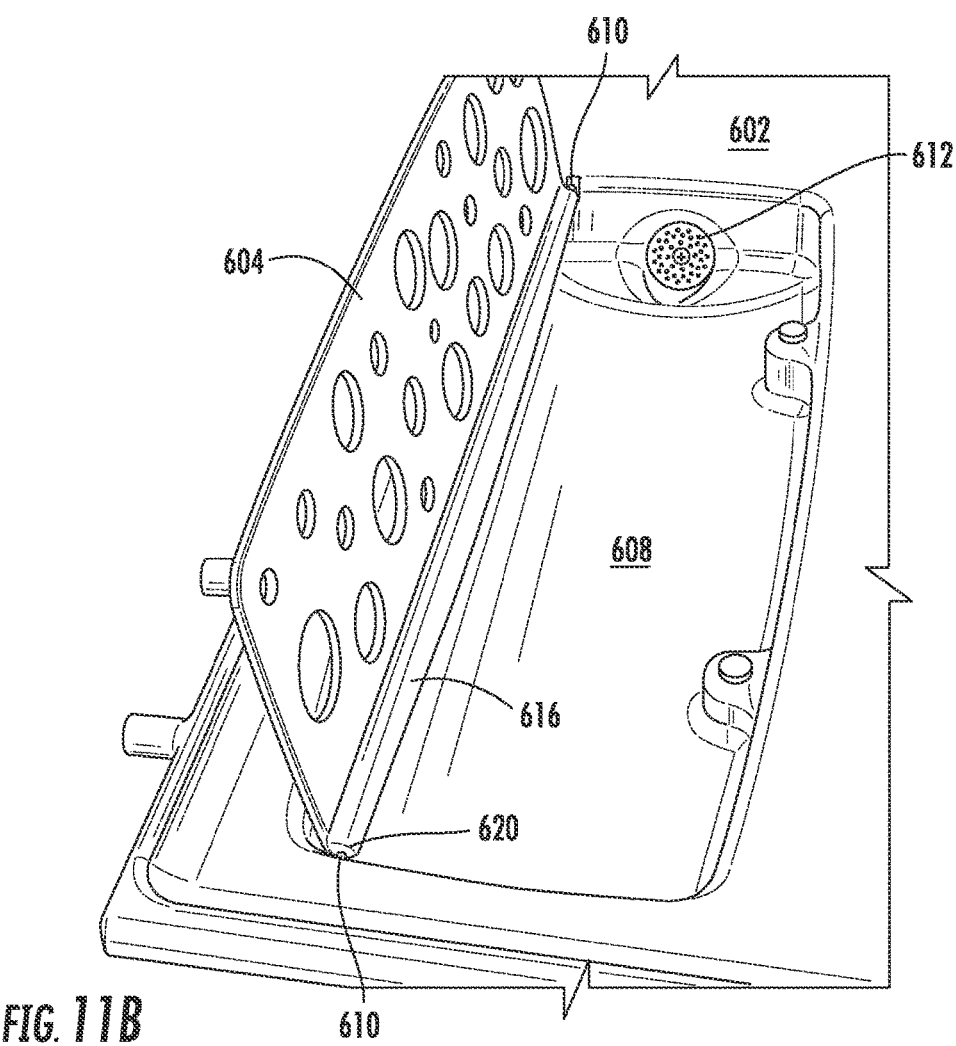
FIG. 11B is a top perspective view of the screen of FIG. 11A in an open position.
Figure 11C:
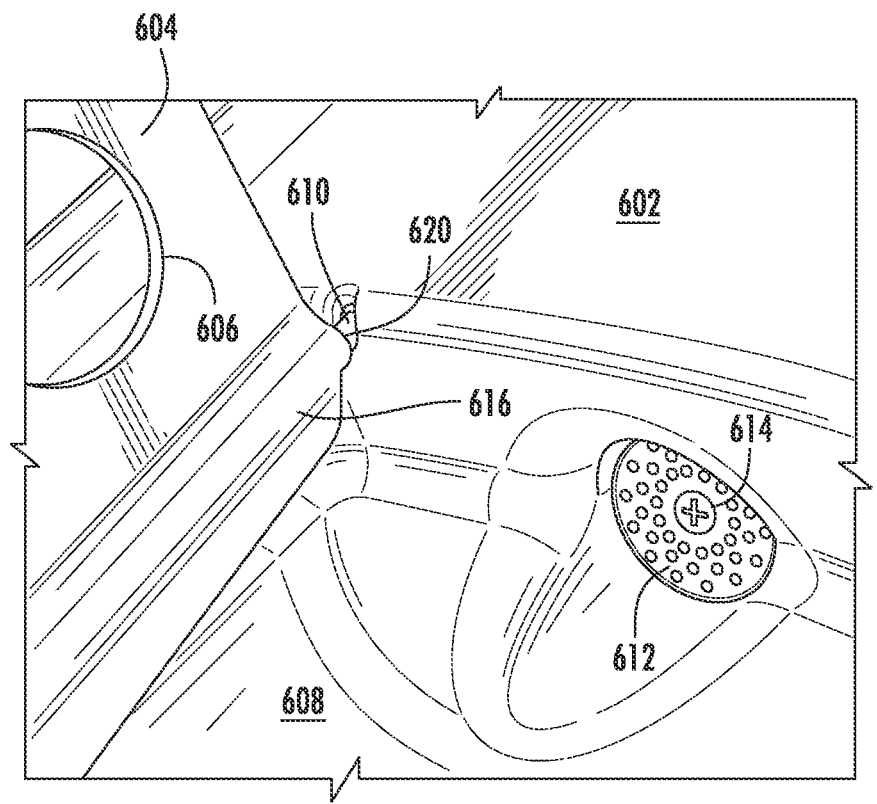
FIG. 11C is a detail top perspective view of the screen of FIG. 11A in an open position.
Figure 11D:
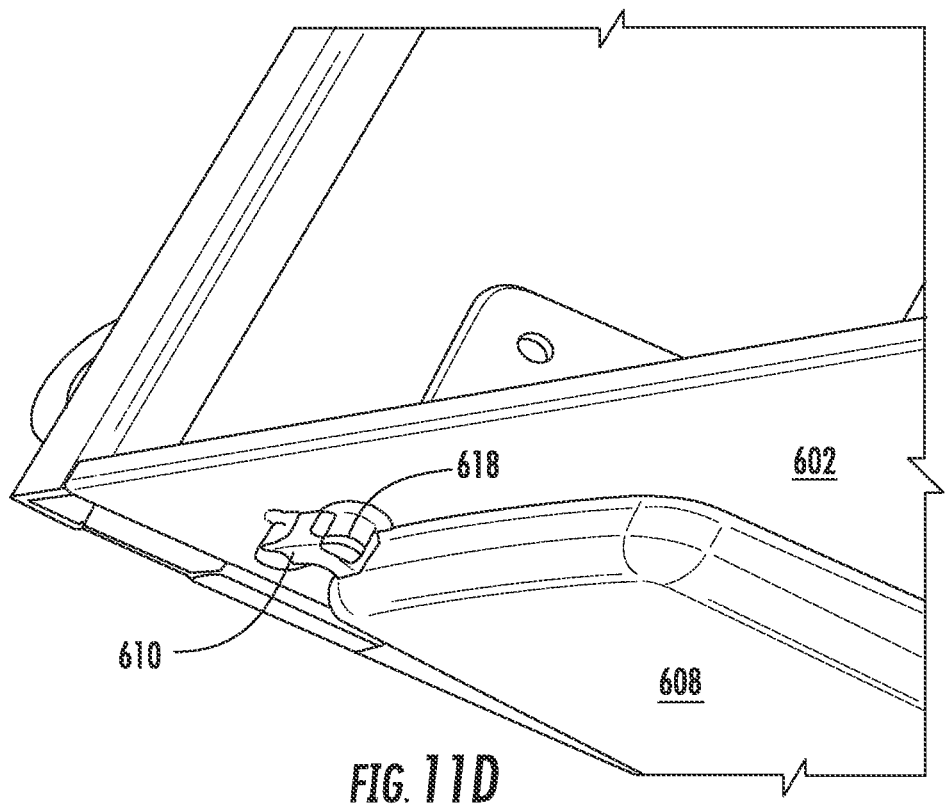
FIG. 11D is a detail bottom perspective view of pins that hold the screen of FIG. 11A.

FIGS. 11A-11D illustrate an example of a sink and sink screen that can be used as part of a drip tray 600 for a galley, such as galley 100. For reference, FIGS. 4B and 6 illustrate a possible placement for the drip tray 600 on the second galley modular unit 250. The drip tray 600 can include a drip surface 602 that can receive any water, coffee, etc. that may be spilled on the galley. The drip surface 602 can include a slope that directs the liquids toward a sink 608. The sink 608 can be covered by a coarse screen 604 that includes relatively large orifices 606 therethrough. The orifices 606 may be all the same size, different sizes, and/or may be arranged in a decorative pattern. The coarse screen 604 can prevent large objects or waste (e.g., napkins, cups, or wrappers) from entering the sink 608 and clogging up a drain. The coarse screen 604 includes a hinge region 616 that allows the screen 604 to be rotated to the position shown in FIGS. 11B and 11C so that the sink 608 can be cleaned. In various aspects, the hinge region 616 is a region of solid material that includes depressions 620 at its ends. For example, the coarse screen 604 could be cast in metal or plastic. The depressions 620 could be cast features or could be machined from the casting. In various other aspects, the hinge region 616 could be a rolled portion of sheet metal that forms the coarse screen 604. The sheet metal could be rolled to approximately form a cylindrical hinge region 616. The depressions 620, in this aspect, could be a hollow shaft traversing the hinge region 616. The coarse screen 604 can be held in place by pins 610 that extend from sides of the sink 608. Referring to FIG. 11D, the pins 610 can be held in place by brackets 618 on an underside of the drip surface 602. As shown in FIG. 11C, the sink 608 can include a fine screen 612 that can prevent smaller waste (e.g., food particles) from entering the drain. The fine screen 612 can be held in place by a screw 614 or other fastener that enables easy removal of the fine screen 612 for cleaning. The above-described drip tray 600 provides a relatively small number of crevasses, seams, and the like in which mold, bacteria, dirt, and the like may accumulate.

Figure 12A:
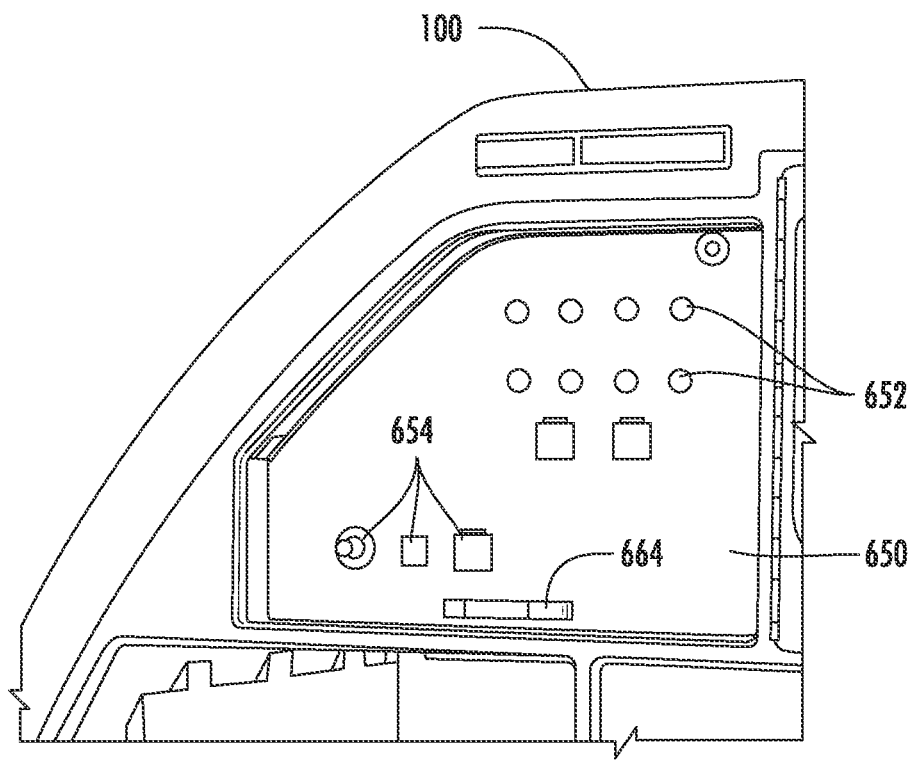
FIG. 12A is a front view of an electrical panel in a galley, wherein the electrical panel is in a stowed position.
Figure 12B:
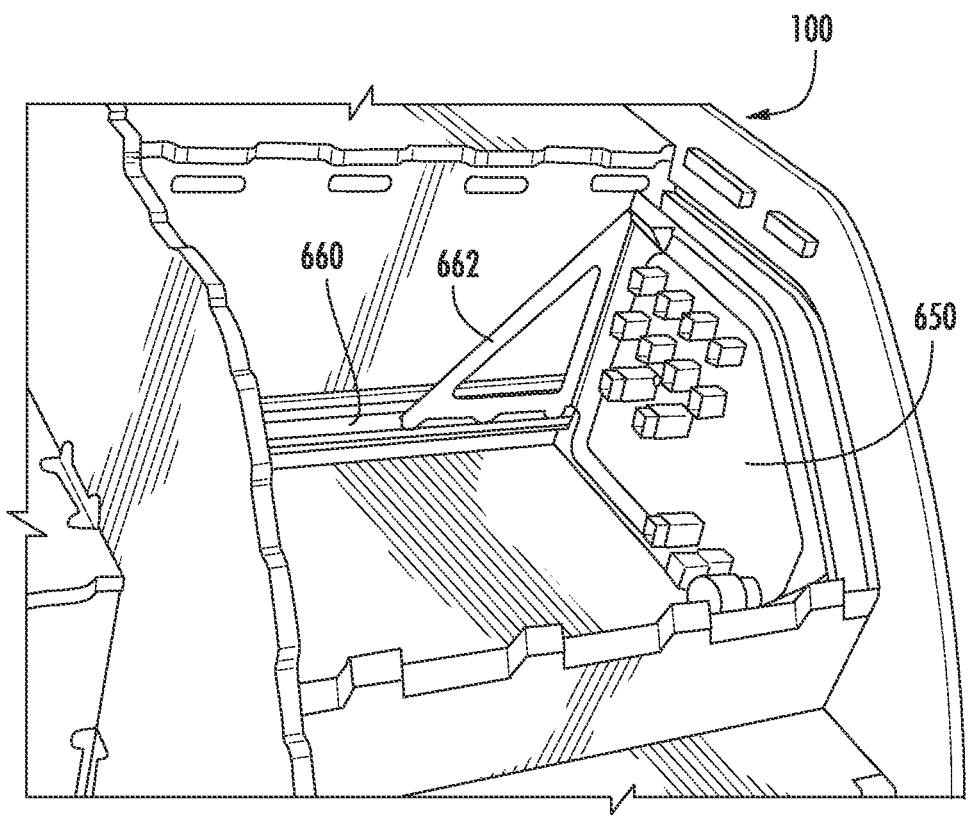
FIG. 12B is a rear perspective partial cross-sectional view of the electrical panel of FIG. 12A.
Figure 12C:
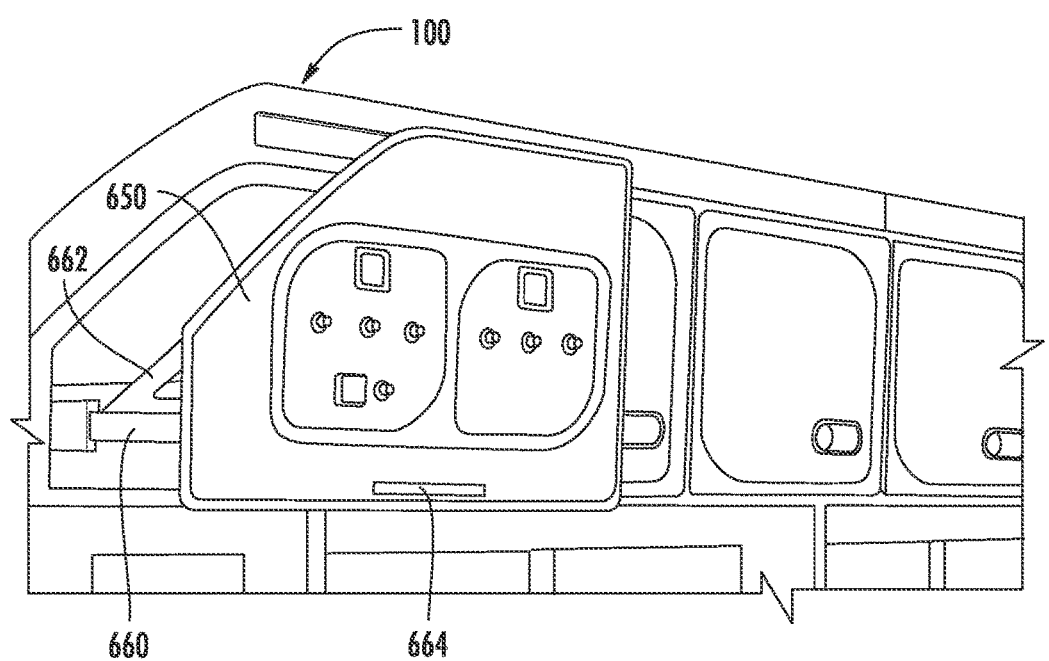
FIG. 12C is a front perspective view of the electrical panel of FIG. 12A in an extended position.

FIGS. 12A-12C illustrate an electrical panel 650 that can be used with the galley 100. The electrical panel 650 can include circuit breakers 652 and various electrical switches 654. For example, the circuit breakers 652 and electrical switches 654 may control electrical power for coffee makers, ovens, and the like. Referring to FIG. 12B, the electrical panel 650 can be connected to the galley 100 by brackets 662 that move along rails 660. In the event that the wiring behind the electrical panel 650 needs to be accessed, a handle 664 on the electrical panel 650 can be pulled out along the rails 660.

The above-described aspects could be applied to units other than galleys. For example, lavatories for aircraft could be provided in a similar modular manner. Additionally, first class suites for aircraft could be provided in a similar modular manner. The above-described aspects could be used in applications other than aircraft. For example, such modular units could be used in recreational vehicles, campers, boats, or the like in which the modular units must be transported through a doorway, port, or the like. Such modular units could also be used in buildings in which the modular units must be transported through a doorway, which may be a confined entry way.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

While the foregoing is directed to aspects of the present invention, other and further aspects of the invention may be devised without departing from the basic scope thereof, and the scope thereof is determined by the claims that follow.

What is claimed is:

1. A modular unit, comprising:
   at least one storage volume in the modular unit, wherein the at least one storage volume includes:
      a first portion that defines a first wall of the storage volume;
      a second portion;
      a first hinge connecting the first portion and the second portion, wherein the second portion is rotatable about the first hinge relative to the first portion between a first transit configuration and a first deployed configuration, wherein the second portion extends the first wall of the storage volume when in the first deployed configuration;
      a fastener configured to engage the first portion and the second portion when the second portion is in the first deployed configuration, wherein the second portion cannot move relative to the first portion when the fastener is engaged; and
      a third portion and a fourth portion, wherein the fourth portion can rotate about a second hinge relative to the third portion between a second transit configuration and a second deployed configuration, wherein the third portion forms a first portion of a ceiling of the first storage volume, and wherein the fourth portion forms a second portion of the ceiling of the storage volume when in the second deployed configuration.

2. The modular unit of claim 1, wherein a width of the first transit configuration is less than a width of the first deployed configuration.

3. The modular unit of claim 1, wherein the first hinge includes an anti-rotation plate having a hole therein for accepting a pin therein, the pin preventing rotation of first hinge when engaged in the hole.

4. The modular unit of claim 3, wherein the pin is a split pin or a cotter pin.

5. The modular unit of claim 1, wherein the second hinge includes an anti-rotation plate having a hole therein for accepting a pin therein, the pin preventing rotation of second hinge when engaged in the hole.

6. The modular unit of claim 1, wherein the fastener is a bracket.

7. A galley modular unit for an aircraft, comprising:
   a first galley modular unit that includes a first portion and a second portion, wherein the second portion can rotate about a first hinge relative to the first portion between a first transit configuration and a first deployed configuration, wherein the first portion forms a first portion of a first wall of the first storage volume, wherein the second portion forms a second portion of the first wall of the first storage volume when in the first deployed configuration, wherein the first portion defines a first storage volume, and wherein the second portion extends the first storage volume when the second portion is in the first deployed configuration;
   a second galley modular unit that includes a third portion and a fourth portion, wherein the fourth portion can rotate about a second hinge relative to the third portion between a second transit configuration and a second deployed configuration, wherein the third portion defines a second storage volume, wherein the fourth portion extends the second storage volume when the fourth portion is in the second deployed configuration, and wherein the second galley modular unit is stackable on top of the first galley modular unit, wherein the first galley modular unit further comprises a fifth portion and a sixth portion, wherein the sixth portion can rotate about a third hinge relative to the fifth portion between a third transit configuration and a third deployed configuration, wherein the fifth portion forms a first portion of a ceiling of the first storage volume, and wherein the sixth portion forms a second portion of the ceiling of the first storage volume when in the third deployed configuration; and
   at least one fastener that couples the first galley modular unit and the second galley modular unit when the second galley modular unit is stacked on top of the first galley modular unit.

8. The galley modular unit of claim 7, wherein, when the sixth portion is in the third transit configuration, the sixth portion blocks the second portion from moving to the first deployed configuration.

9. The galley modular unit of claim 7, wherein the at least one fastener includes:
   a first bracket attached to the first galley modular unit, wherein the first bracket includes a slot, wherein a first portion of the slot defines a first slot width, and wherein a second portion of the slot defines a second slot width; and
   a second bracket attached to the second galley modular unit, wherein the second bracket includes a tang, wherein the tang defines a width that is narrower than the first slot width and wider than the second slot width;
   wherein the second galley modular unit is affixed to the first galley modular unit by:
      lowering the second galley modular unit onto the first galley modular unit such that the tang passes through the first portion of the slot; and
      sliding the second galley modular unit relative to the first galley modular unit such that the tangs translate to respective ones of the second portions of the slots.

10. The galley modular unit of claim 7, wherein the at least one fastener includes:
    a bracket that rests against a surface of the first galley modular unit and a surface of the second galley modular unit;

a first fastening device selected from the group consisting of a screw, a bolt, and a rivet affixing the bracket to the first galley modular unit; and a second fastening device selected from the group consisting of a screw, a bolt, and a rivet affixing the bracket to the second galley modular unit.

11. The galley modular unit of claim 7, wherein the at least one fastener includes a spring-loaded latch that automatically engages when the second galley modular unit is arranged on the first galley modular unit.

12. The galley modular unit of claim 7, further comprising a second fastener configured to engage the first portion and the second portion when the second portion is in the first deployed configuration, wherein the second portion cannot move relative to the first portion when the second fastener is engaged.

13. The galley modular unit of claim 7, further comprising a sealant disposed in a gap between the first portion and the second portion when the second portion is in the deployed configuration.

14. The galley modular unit of claim 7, wherein the first galley modular unit includes a third storage volume, and wherein the first galley modular unit further comprises a bi-fold door that is movable between an open position and a closed position, wherein the bi-fold door covers the third storage volume when in the closed position, wherein the bi-fold door includes a first door panel and a second door panel, and wherein the bi-fold door includes a seal on the first door panel that interacts with the second door panel to form a seal when the bi-fold door is in the closed position.

15. A modular unit, comprising:
a first storage volume, wherein the first storage volume includes:
a first portion that forms a wall of the first storage volume;
a second portion;
a first hinge connecting the first portion and the second portion, wherein the second portion is rotatable about the first hinge relative to the first portion between a first transit configuration and a first deployed configuration, wherein the second portion extends the wall of the first storage volume when in the first deployed configuration;
a third portion that forms a ceiling of the first storage volume;
a fourth portion; and
a second hinge, wherein the fourth portion can rotate about the second hinge relative to the third portion between a second transit configuration and a second deployed configuration, and wherein the fourth portion extends the ceiling of the first storage volume when in the second deployed configuration;
a second storage volume, wherein the second storage volume includes:
a fifth portion that forms a wall of the second storage volume;
a sixth portion; and
a third hinge, wherein the sixth portion can rotate about a third hinge relative to the fifth portion between a third transit configuration and a third deployed configuration, wherein the sixth portion extends the wall of the second storage volume when the sixth portion is in the third deployed configuration, and wherein the second storage volume is stackable on top of the first storage volume; and
at least one fastener that attaches the first storage volume and the second storage volume when the second storage volume is stacked on top of the first storage volume.

16. The modular unit of claim 15, wherein, when the fourth portion is in the second transit configuration, the fourth portion blocks the second portion from moving to the first deployed configuration.

17. The modular unit of claim 15, wherein the at least one fastener includes:
a first bracket attached to the first storage volume, wherein the first bracket includes a slot, wherein a first portion of the slot defines a first slot width, and wherein a second portion of the slot defines a second slot width; and
a second bracket attached to the second storage volume, wherein the second bracket includes a tang, wherein the tang defines a width that is narrower than the first slot width and wider than the second slot width;
wherein the second storage volume is attached to the first storage volume by:
lowering the second storage volume onto the first storage volume such that the tang passes through the first portion of the slot; and
sliding the second storage volume relative to the first storage volume such that the tangs translate to respective ones of the second portions of the slots.

18. The modular unit of claim 15, wherein the at least one fastener includes:
a bracket that rests against a surface of the first storage volume and a surface of the second storage volume;
a first fastening device selected from the group consisting of a screw, a bolt, and a rivet affixing the bracket to the first storage volume; and
a second fastening device selected from the group consisting of a screw, a bolt, and a rivet affixing the bracket to the second storage volume.

19. The modular unit of claim 15, wherein the at least one fastener includes a spring-loaded latch that automatically engages when the second storage volume is arranged on the first storage volume.

20. The modular unit of claim 15, further comprising:
a third storage volume; and
a bi-fold door that is movable between an open position and a closed position, wherein the bi-fold door covers the third storage volume when in the closed position, wherein the bi-fold door includes a first door panel and a second door panel, and wherein the bi-fold door includes a seal on the first door panel that interacts with the second door panel to form a seal when the bi-fold door is in the closed position.

* * * * *